(12) United States Patent
Kyosuna et al.

(10) Patent No.: US 10,955,971 B2
(45) Date of Patent: Mar. 23, 2021

(54) INFORMATION INPUT DEVICE AND INFORMATION INPUT METHOD

(71) Applicant: NEC CORPORATION, Tokyo (JP)

(72) Inventors: Satoshi Kyosuna, Tokyo (JP); Hirofumi Tsuda, Tokyo (JP); Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/345,307

(22) PCT Filed: Oct. 20, 2017

(86) PCT No.: PCT/JP2017/038047
§ 371 (c)(1),
(2) Date: Apr. 26, 2019

(87) PCT Pub. No.: WO2018/079446
PCT Pub. Date: May 3, 2018

(65) Prior Publication Data
US 2019/0302964 A1 Oct. 3, 2019

(30) Foreign Application Priority Data

Oct. 27, 2016 (JP) .............................. JP2016-21092

(51) Int. Cl.
*G06F 3/042* (2006.01)
*G06T 7/70* (2017.01)
(Continued)

(52) U.S. Cl.
CPC .......... *G06F 3/0425* (2013.01); *G03B 21/00* (2013.01); *G03B 21/14* (2013.01); *G06F 3/01* (2013.01);
(Continued)

(58) Field of Classification Search
None
See application file for complete search history.

(56) References Cited

U.S. PATENT DOCUMENTS

2009/0102603 A1\* 4/2009 Fein ...................... G06F 3/0304
340/5.81
2010/0251176 A1\* 9/2010 Fong ................... G06F 3/04886
715/821
(Continued)

FOREIGN PATENT DOCUMENTS

JP 2008-143220 A 6/2008
JP 2009-151380 A 7/2009
(Continued)

OTHER PUBLICATIONS

Yuto Masaki et al., "Research on relationship between haptic feeling and operability in Hand-Panel interface", Human Interface Symposium 2013, Sep. 10, 2013, pp. 325-328 (total 4 pages).
(Continued)

*Primary Examiner* — Patrick N Edouard
*Assistant Examiner* — Peijie Shen

(57) ABSTRACT

In order to enable any user to perform an input operation intuitively and safely in a situation where input operation is required, the control device detects an subject entering a projection range based on the characteristics of subjects included in image data generated by controlling an imaging device, controls a projection device to project projection light on a projection surface so that display information for receiving input is displayed over the projection surface, detects when a pointing body has entered the area above the projection surface based on the image data, identifies the content of an instruction based on the positional relation between the display information displayed over the projection surface and the instructing portion of the pointing body, controls a communication device to transmit the identified
(Continued)

instruction content as input information, and controls the projection device not to project the projection light on a projection-prohibited surface.

8 Claims, 31 Drawing Sheets

(51) Int. Cl.
| | |
|---|---|
| *G06F 3/01* | (2006.01) |
| *G06F 21/36* | (2013.01) |
| *H04N 9/31* | (2006.01) |
| *H04N 5/74* | (2006.01) |
| *G03B 21/14* | (2006.01) |
| *G09G 5/36* | (2006.01) |
| *G06F 3/0346* | (2013.01) |
| *G03B 21/00* | (2006.01) |
| *G09G 5/00* | (2006.01) |

(52) U.S. Cl.
CPC ............ *G06F 3/011* (2013.01); *G06F 3/0346* (2013.01); *G06F 3/042* (2013.01); *G06F 21/36* (2013.01); *G06T 7/70* (2017.01); *G09G 5/00* (2013.01); *G09G 5/36* (2013.01); *H04N 5/74* (2013.01); *H04N 9/312* (2013.01); *H04N 9/3155* (2013.01); *H04N 9/3179* (2013.01); *G06T 2207/20081* (2013.01); *G06T 2207/30196* (2013.01)

(56) References Cited

U.S. PATENT DOCUMENTS

| | | | | |
|---|---|---|---|---|
| 2010/0315565 A1* | 12/2010 | Bloom | ................ | H04N 9/3132 348/744 |
| 2011/0302532 A1* | 12/2011 | Missig | ................ | G06F 3/0488 715/823 |
| 2013/0044054 A1* | 2/2013 | Lee | ................ | G06F 3/017 345/158 |
| 2013/0155018 A1* | 6/2013 | Dagdeviren | ........ | G06F 3/03543 345/174 |
| 2014/0002421 A1* | 1/2014 | Lee | ................ | G06F 3/0425 345/179 |
| 2014/0292648 A1* | 10/2014 | Matsuda | ................ | G06F 3/005 345/156 |
| 2015/0145774 A1* | 5/2015 | Ostberg | ................ | G06F 3/04883 345/158 |
| 2015/0186039 A1* | 7/2015 | Ide | ................ | H04N 9/3194 345/168 |
| 2015/0234454 A1* | 8/2015 | Kurz | ................ | G06F 3/011 345/156 |
| 2015/0332075 A1* | 11/2015 | Burch | ................ | G06F 3/017 345/156 |
| 2016/0011493 A1* | 1/2016 | Okumura | ........... | G03B 21/2033 353/31 |
| 2016/0238833 A1* | 8/2016 | Okumura | ............... | G06F 1/1643 |
| 2017/0140552 A1* | 5/2017 | Woo | ................ | G06T 7/73 |
| 2017/0220119 A1* | 8/2017 | Potts | ................ | G06F 3/0383 |
| 2017/0339378 A1* | 11/2017 | Okumura | ................ | G06F 3/017 |
| 2019/0302963 A1* | 10/2019 | Harrison | ................ | G06F 3/0418 |

FOREIGN PATENT DOCUMENTS

| | | | | |
|---|---|---|---|---|
| JP | 2013-125181 A | 6/2013 | | |
| JP | 2015-111772 A | 6/2015 | | |
| JP | 2015-121979 A | 7/2015 | | |
| JP | 2016-5157 A | 1/2016 | | |
| WO | 2010/107072 A1 | 9/2010 | | |
| WO | WO-2010107072 A1 * | 9/2010 | ............. | G06F 3/017 |
| WO | 2014/034527 A1 | 3/2014 | | |
| WO | 2015/105044 A1 | 7/2015 | | |

OTHER PUBLICATIONS

International Search Report for PCT/JP2017/038047 dated Dec. 12, 2017 [PCT/ISA/210].
Written Opinion for PCT/JP2017/038047 dated Dec. 12, 2017 [PCT/ISA/237].
Communication dated Jan. 21, 2020 from Japanese Patent Office in JP Application No. 2018-547634.

* cited by examiner

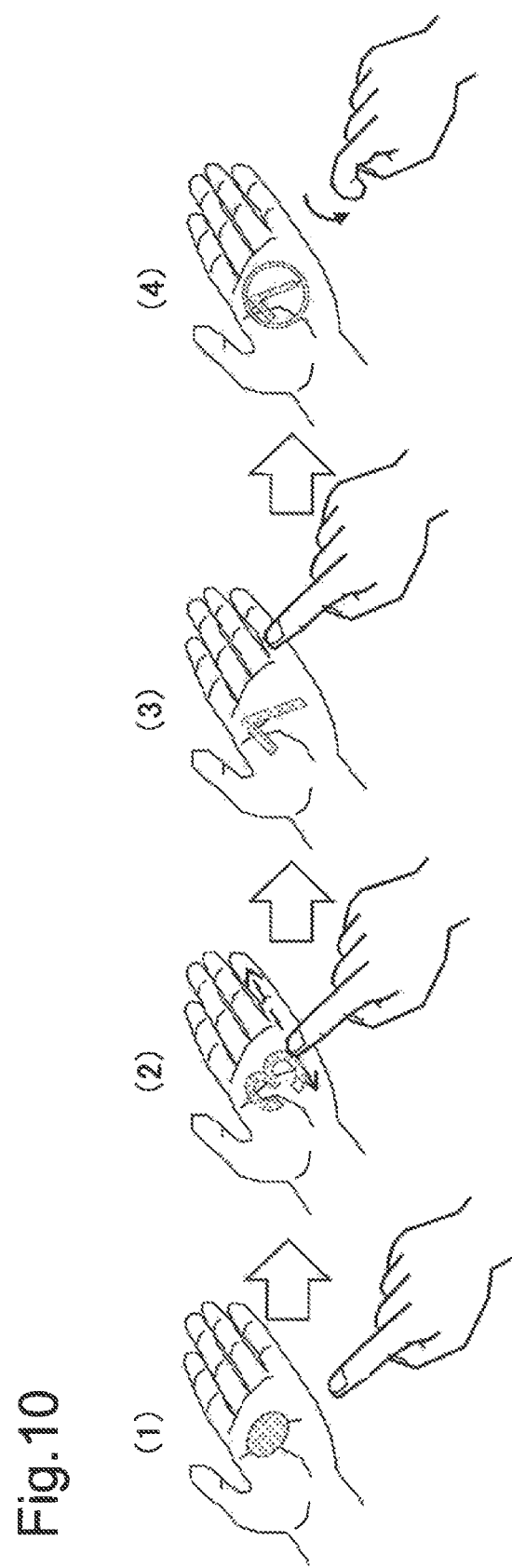

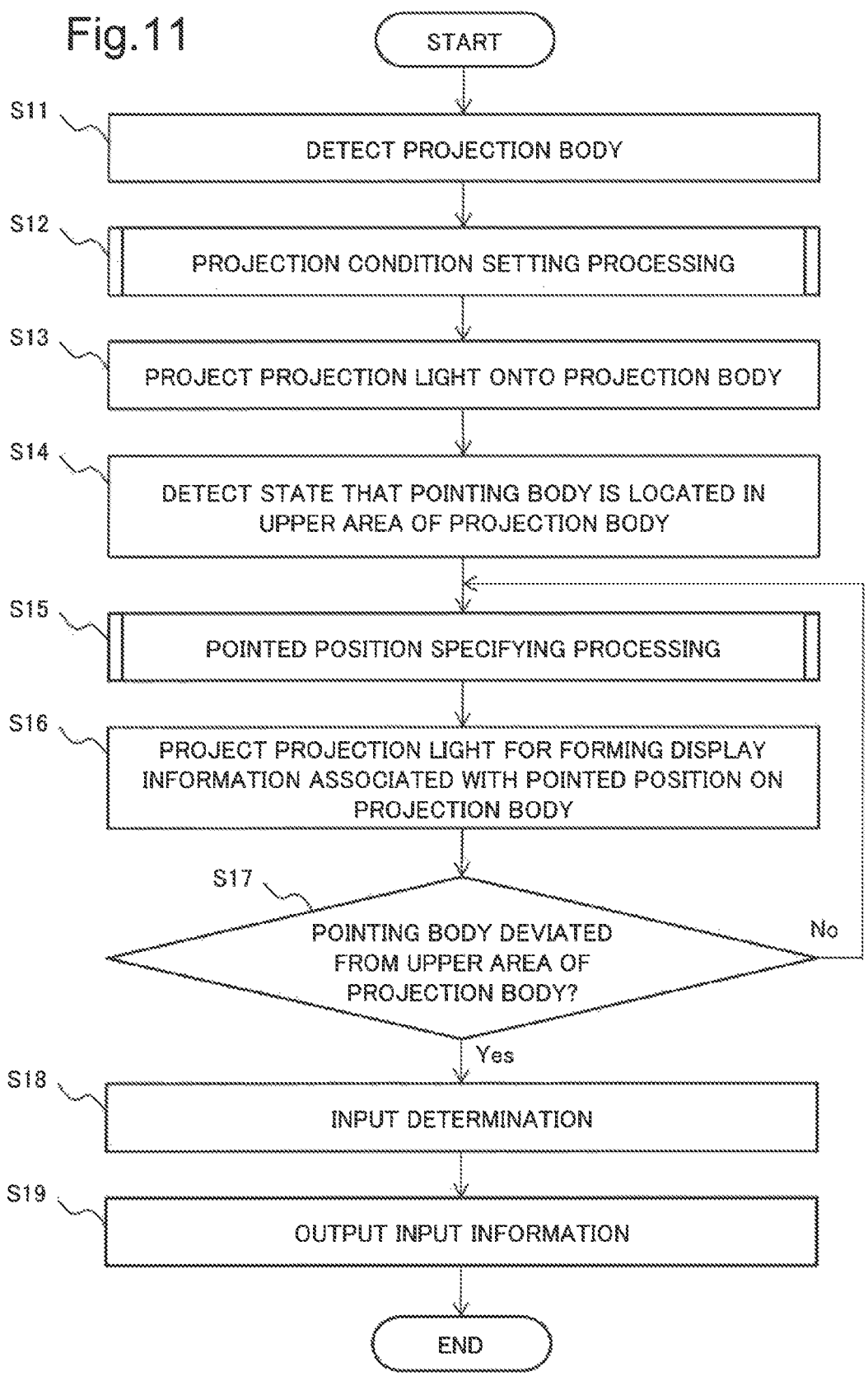

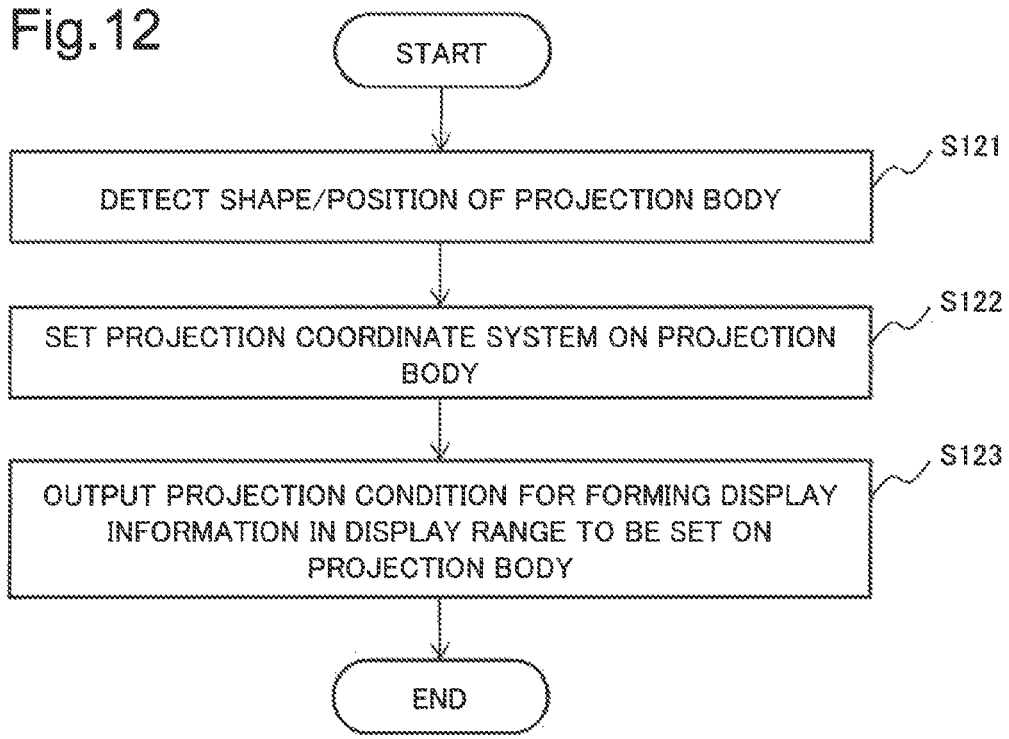
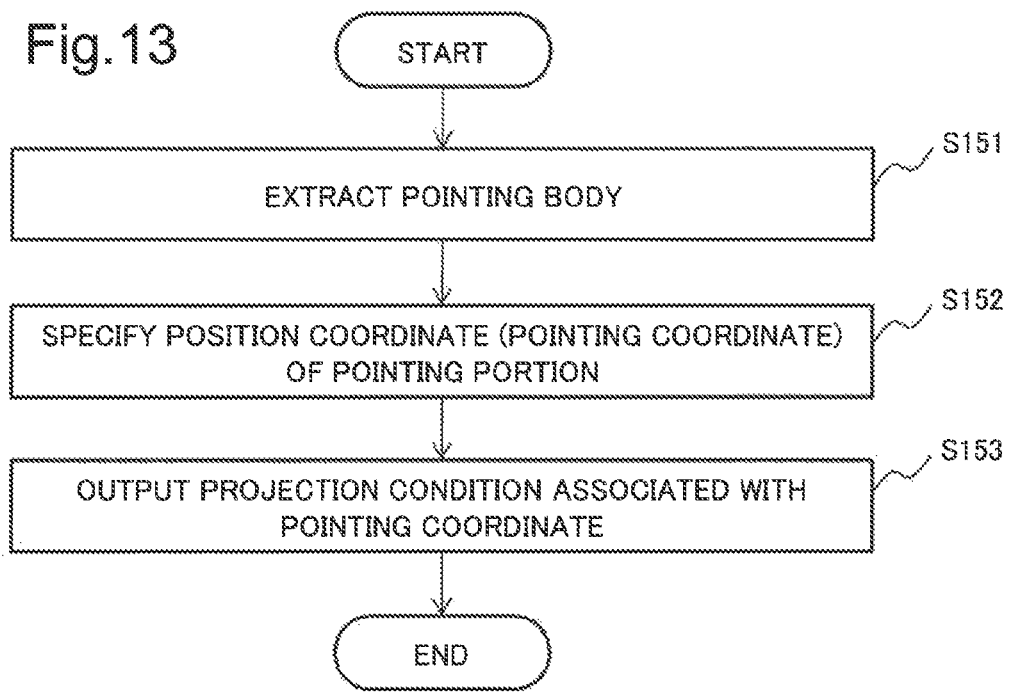

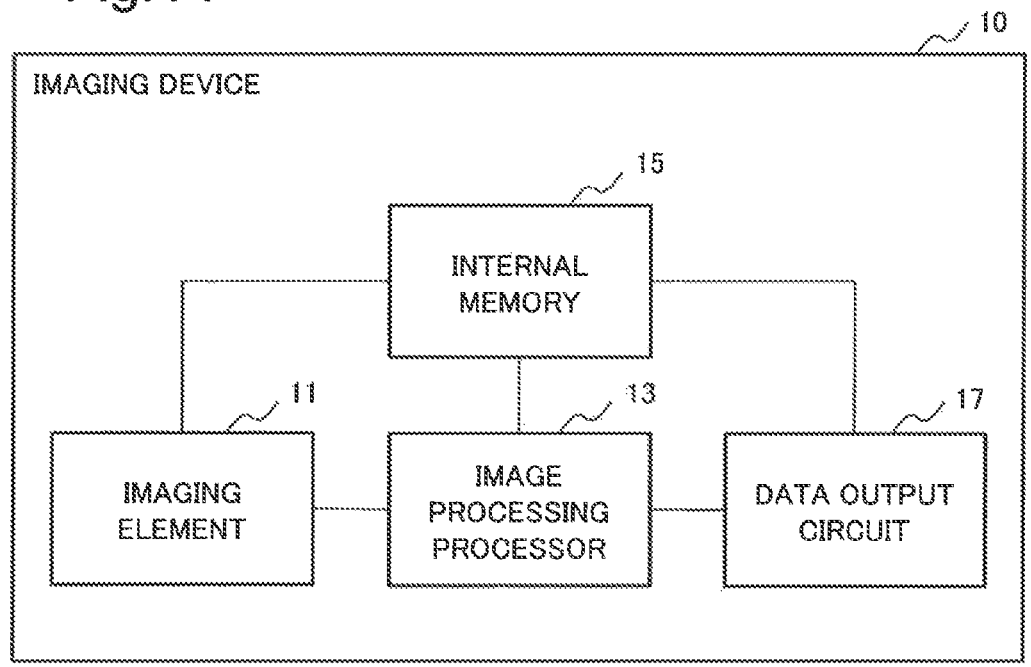

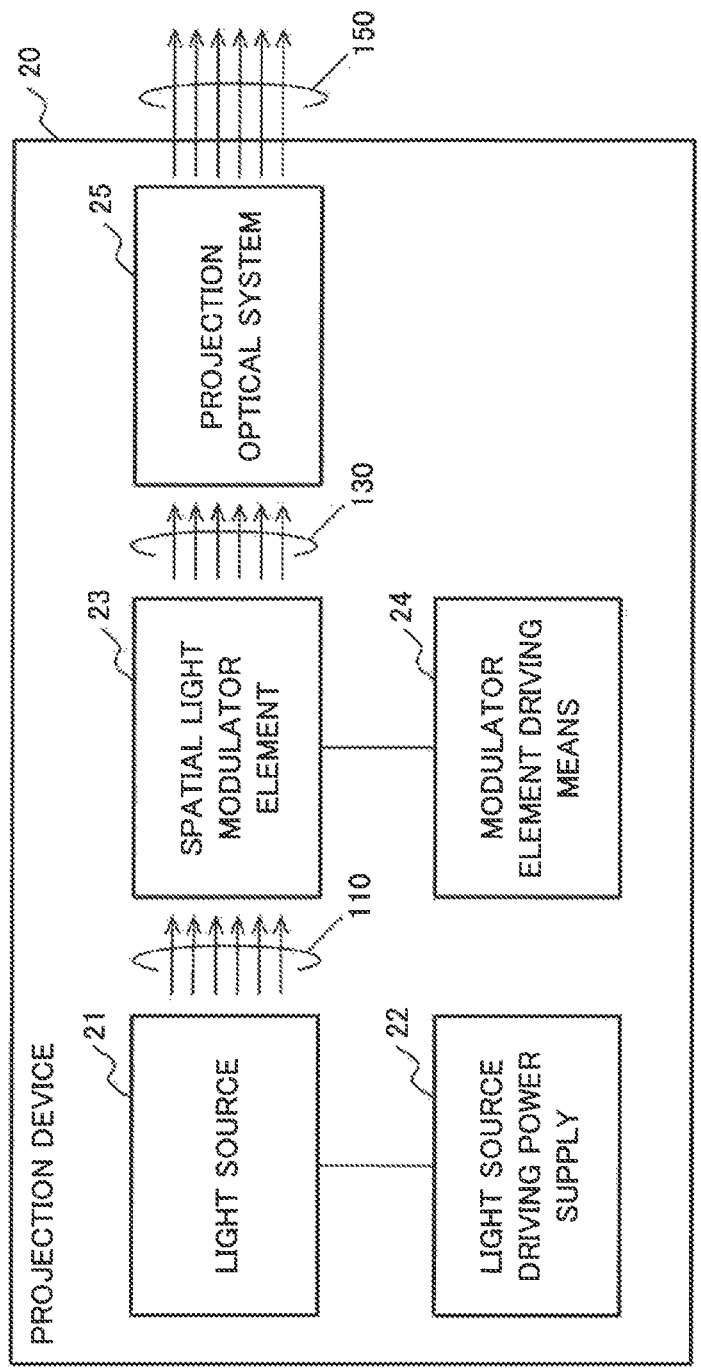

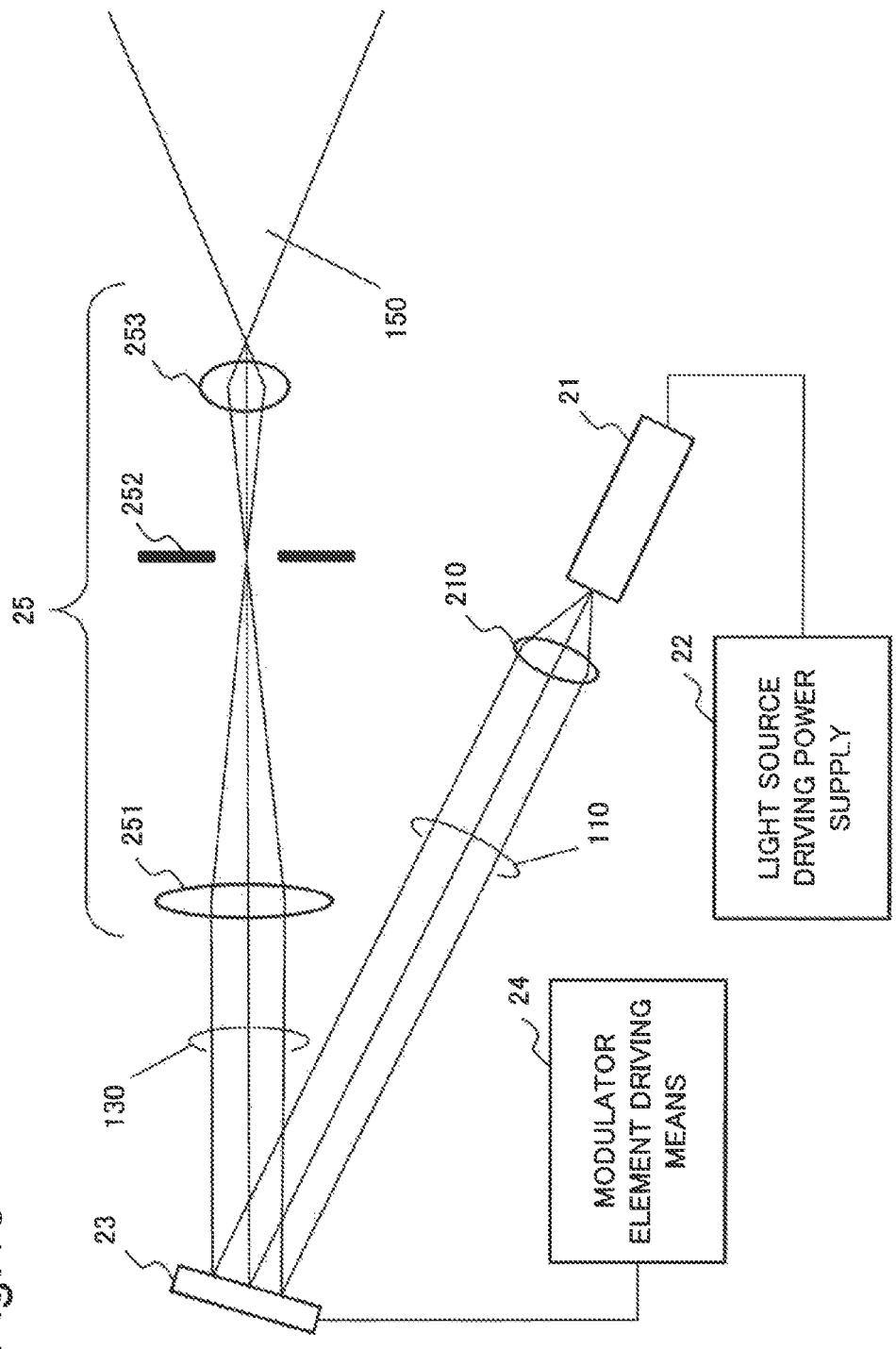

INFORMATION INPUT DEVICE AND INFORMATION INPUT METHOD

CROSS REFERENCE TO RELATED APPLICATIONS

This application is a National Stage of International Application No. PCT/JP2017/038047, filed on Oct. 20, 2017, which claims priority from Japanese Patent Application No. 2016-210192, filed on Oct. 27, 2016, the contents of all of which are incorporated herein by reference in their entirety.

TECHNICAL FIELD

The present invention relates to an information input device and an information input method. In particular, the present invention relates to an information input device and an information input method for recognizing an input operation performed with respect to a user interface projected from a projector by capturing an image by using a camera.

BACKGROUND ART

In recent years, a system capable of intuitively inputting information with respect to a user interface (hereinafter, a UI) which is projected from a projector is reported. Examples of the system are SixthSense by the Massachusetts Institute of Technology (MIT) and OmniTouch by Microsoft Corporation (registered trademark). In SixthSense and OmniTouch, an input operation performed by a finger with respect to a virtual UI to be projected onto a projection body is recognized by a camera or a depth sensor. For example, SixthSense and OmniTouch track a color marker put on a fingertip by a camera, and detect an input position on a UI.

Putting a color marker on a fingertip on a daily basis, however, is not practical, and performing an input operation by a finger with nothing worn thereon is needed. However, when a fingertip with nothing worn thereon is tracked by a camera, it is difficult to accurately discriminate a hand palm and a finger substantially having a same color from each other. Using a depth sensor enables to discriminate a hand palm and a finger from each other at a close distance. However, when the distance increases a little, discrimination becomes difficult, and it is difficult to implement a practical interface.

PTL 1 discloses a wearable information input device, which is used when being worn on the upper limb of a user, and with which the user is allowed to input by an intuitive operation. For example, the device of PTL 1 is worn on the wrist of one of hands, and recognizes that a fingertip of the other hand touches the palm of the one hand, or a position or motion of a fingertip that touches a hand palm, by a sensor.

PTL 2 discloses a projection device for, when a specific portion of a user's body is detected, projecting an image onto a specific target object, and projecting an information input image onto the specific portion. The device of PTL 2 acquires an input operation performed with respect to a projected information input image by a depth sensor.

PTL 3 discloses an information presentation system for recognizing an operation applied to video information projected from a projector, by a camera. The system of PTL 3 projects video data from a projector onto a user's hand palm serving as an information presentation medium. The system of PTL 3 detects a displacement of a hand palm, based on imaging data of a camera, during projection of video data. Then, the system of PTL 3 determines whether the detected displacement of the hand palm satisfies a predetermined displacement condition, and when it is determined that the displacement condition is satisfied, the system generates video data acquired by reflecting the detected displacement of the hand palm to video data during projection. Then, the system of PTL 3 projects the generated video data from the projector onto the hand palm, in place of the video data during projection.

CITATION LIST

Patent Literature

[PTL 1] Japanese Unexamined Patent Application Publication No. 2015-121979
[PTL 2] Japanese Unexamined Patent Application Publication No. 2015-111772
[PTL 3] Japanese Unexamined Patent Application Publication No. 2009-151380

SUMMARY OF INVENTION

Technical Problem

In the device of PTL 1, input is enabled by an intuitive operation when the device is worn. However, in the device of PTL 1, there is an issue that any user who does not wear the device in a scene where input processing is necessary cannot perform the input processing, since the device needs to be worn on the upper limb when being used.

In the device of PTL 2, a user is able to naturally recognize presence of a projection unit for projecting an image onto a specific target object, when a specific portion of the user's body is detected. Although the device of PTL 2 is able to detect a projection target by a depth sensor, when a projection prohibited range is included in a projection range, light may be projected in the projection prohibited range.

In the device of PTL 3, an operation being intuitive and friendly to a user is achieved. However, in the device of PTL 3, there is an issue that, when a displacement of a hand palm does not satisfy a predetermined displacement condition, video data cannot be projected onto the hand palm.

In order to solve the above-described issues, an object of the present invention is to provide an information input device with which any user is allowed to perform intuitive input processing safely in a scene where the input processing is necessary.

Solution to Problem

An information input device according to the present invention includes: a projection device for projecting projection light in a projection range; an imaging device for generating image data by capturing the projection range; a control device for controlling the projection device and the imaging device; and a communication device for communicating with an outside in response to control by the control device. The control device controls the projection device in such a way as to detect a target entering the projection range, based on a feature of the target including a projection body and a projection prohibited body being included in the image data generated by controlling the imaging device, and project, onto the projection body, projection light that causes to display, on the projection body, display information for accepting an input. The control device controls the communication device in such a way as to detect that a pointing body enters an upper area of the projection body, based on the image data, identify a pointed content, based on a positional relationship between the display information displayed on the projection body, and a pointing portion included in the pointing body, and transmit the identified pointed content to an outside as input information. The control device controls the projection device in such a way as not to project projection light onto the projection prohibited body.

An information input method according to the present invention is an information input method using an information input device including a projection device for projecting projection light in a projection range, an imaging device for generating image data by capturing the projection range, a control device for controlling the projection device and the imaging device, and a communication device for communicating with an outside in response to control by the control device. The method includes: causing the control device to control the projection device in such a way as to detect a target entering the projection range, based on a feature of the target including a projection body and a projection prohibited body being included in the image data generated by controlling the imaging device, and project, onto the projection body, projection light that causes to display, on the projection body, display information for accepting an input, to control the communication device in such a way as to detect that a pointing body enters an upper area of the projection body, based on the image data, identify a pointed content, based on a positional relationship between the display information displayed on the projection body, and a pointing portion included in the pointing body, and transmit the identified pointed content to an outside as input information, and to control the projection device in such a way as not to project projection light onto the projection prohibited body.

Advantageous Effects of Invention

According to the present invention, it is possible to provide an information input device with which any user is allowed to perform intuitive input processing safely in a scene where the input processing is necessary.

BRIEF DESCRIPTION OF DRAWINGS

FIG. 10 is a conceptual diagram illustrating an example of an information input method using a user interface displayed by the information input device according to the first example embodiment of the present invention.

FIG. 11 is a flowchart illustrating an operation of the information input device according to the first example embodiment of the present invention.

FIG. 12 is a flowchart illustrating projection condition setting processing of the information input device according to the first example embodiment of the present invention.

FIG. 13 is a flowchart illustrating pointed position specifying processing of the information input device according to the first example embodiment of the present invention.

FIG. 14 is a conceptual diagram illustrating a configuration of an imaging device included in the information input device according to the first example embodiment of the present invention.

FIG. 15 is a conceptual diagram illustrating a configuration of a projection device included in the information input device according to the first example embodiment of the present invention.

FIG. 16 is a conceptual diagram illustrating a configuration of an optical system of the projection device included in the information input device according to the first example embodiment of the present invention.

EXAMPLE EMBODIMENT

Figure 1:
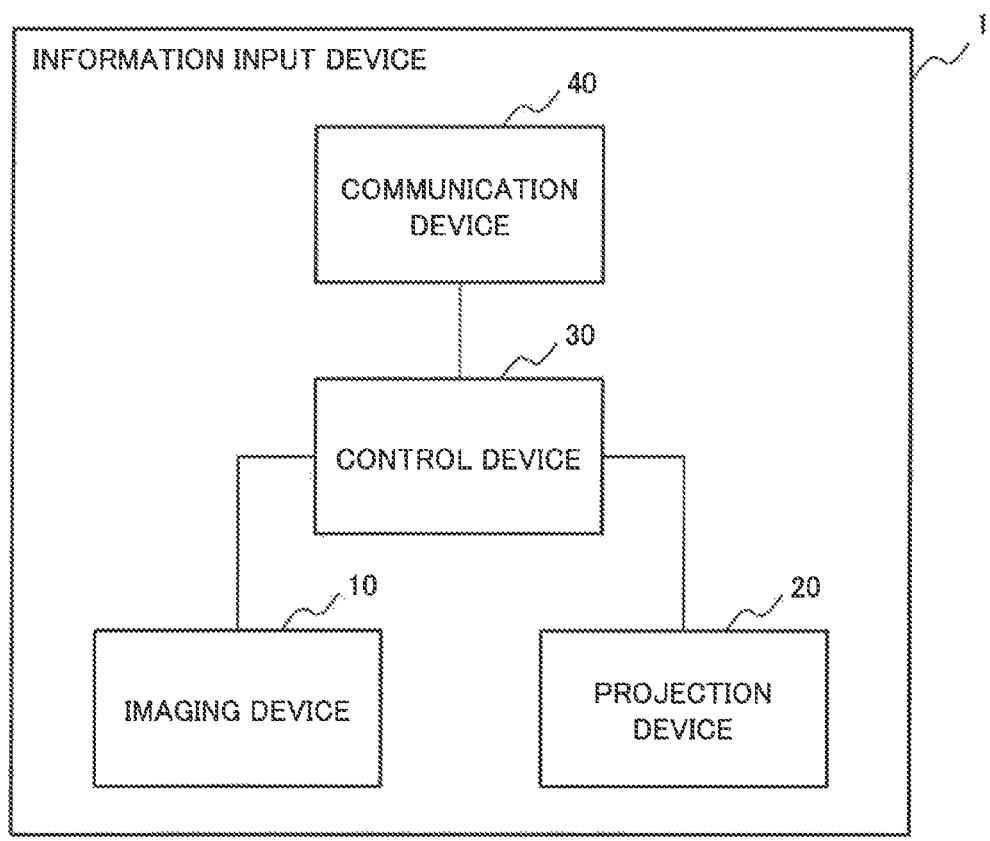
FIG. 1 is a block diagram illustrating a configuration of an information input device according to a first example embodiment of the present invention.

In the following, example embodiments for implementing the present invention are described using the drawings. The below-described example embodiments include technically preferred limitations in order to implement the present invention. However, the scope of the invention is not limited to the following. Note that, in all drawings for use in describing the following example embodiments, unless there is particularly a reason, similar elements are indicated with same reference numbers. Further, in the following example embodiments, repeated description relating to a similar configuration/operation may be omitted. Further, in the following example embodiments, directions of arrows among blocks in the drawings simply indicate an example of flows of signals, and do not limit directions of flows of signals.

First Example Embodiment

[Configuration]

FIG. 1 is a block diagram illustrating a configuration of an information input device 1 according to the present example embodiment. The information input device 1 includes an imaging device 10, a projection device 20, a control device 30, and a communication device 40.

The imaging device 10 is a camera having an imaging function. The projection device 20 is a projector having a projection function. The control device 30 is a device for controlling the imaging device 10 and the projection device 20. The communication device 40 has a communication function of outputting input information to the outside by wired communication or wireless communication.

Figure 2:
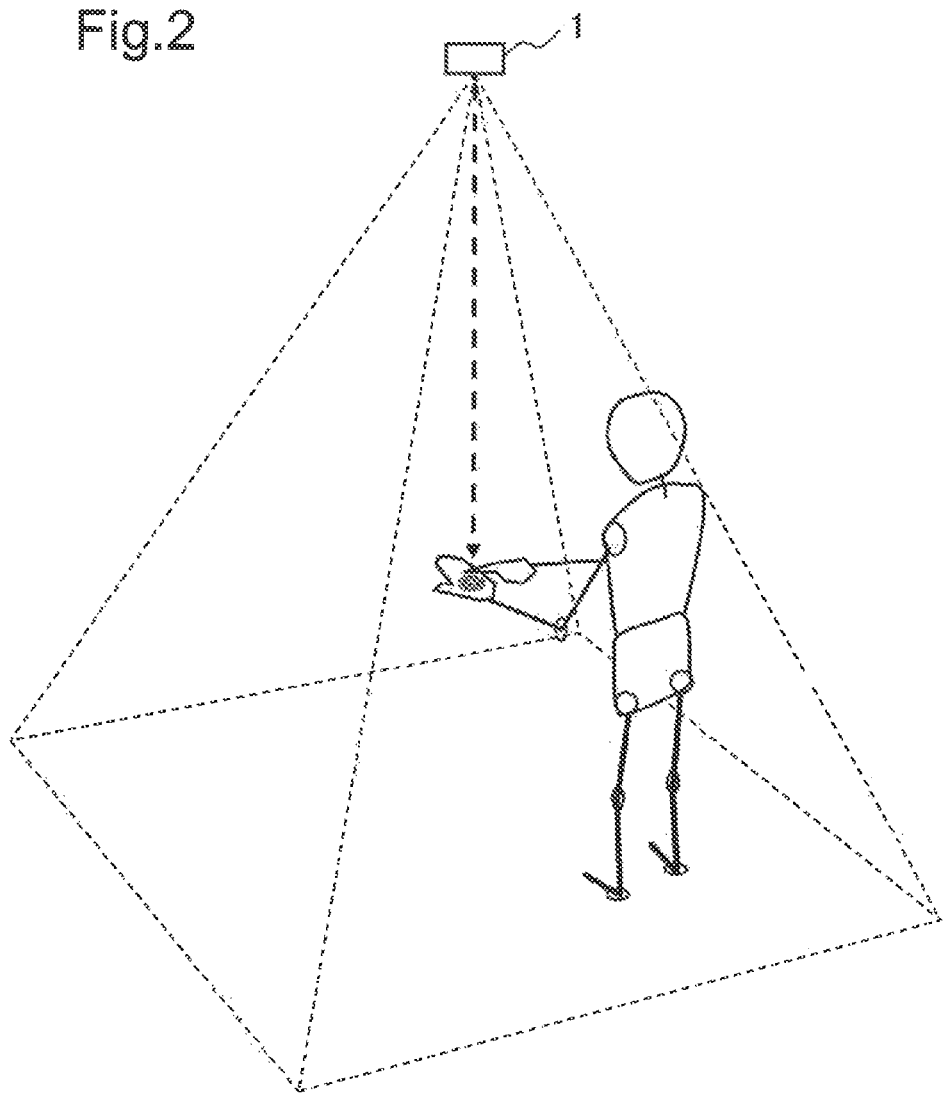
FIG. 2 is a conceptual diagram illustrating a use example of the information input device according to the first example embodiment of the present invention.

FIG. 2 is a conceptual diagram illustrating a typical use scene of the information input device 1 of the present example embodiment. For example, the information input device 1 of the present example embodiment is used for inputting authentication information such as a password at an entrance or the like of a place where a security level is high. FIG. 2 is an example in which the information input device 1 is installed above an authentication target person (hereinafter, a target person), and displays a user interface (hereinafter, a UI) on a hand palm (also referred to as a projection body) of the target person.

As illustrated in FIG. 2, a projection range of projection light to be projected from the information input device 1 is a three-dimensional space inside a substantially quadrangular pyramid having a projection portion of the information input device 1 as a vertex. Further, a surface where projection light impinges among surfaces of an object located in a projection range serves as a projection surface.

The information input device 1 captures a range including a hand palm of a target person, and generates image data of a range including a projection surface within a projection range. The information input device 1 specifies a position of the hand palm by analyzing the generated image data, and projects projection light for displaying a UI on the hand palm. The information input device 1 is able to detect a hand palm of a target person within a projection range by verifying the projection range at a predetermined timing, or receiving a notification indicating that a target person enters the projection range from another system.

The information input device 1 specifies a pointed content performed by a finger (also referred to as a pointing body) with respect to a UI displayed on a hand palm of an authentication target person, and projects projection light for displaying display information associated with the specified pointed content on the hand palm.

When detecting an input operation by an authentication target person, the information input device 1 outputs, to a system such as an external authentication system, display information selected by the finger as input information.

[Control Device]

Next, a detailed configuration of the control device 30 included in the information input device 1 is described with reference to the drawings.

Figure 3:
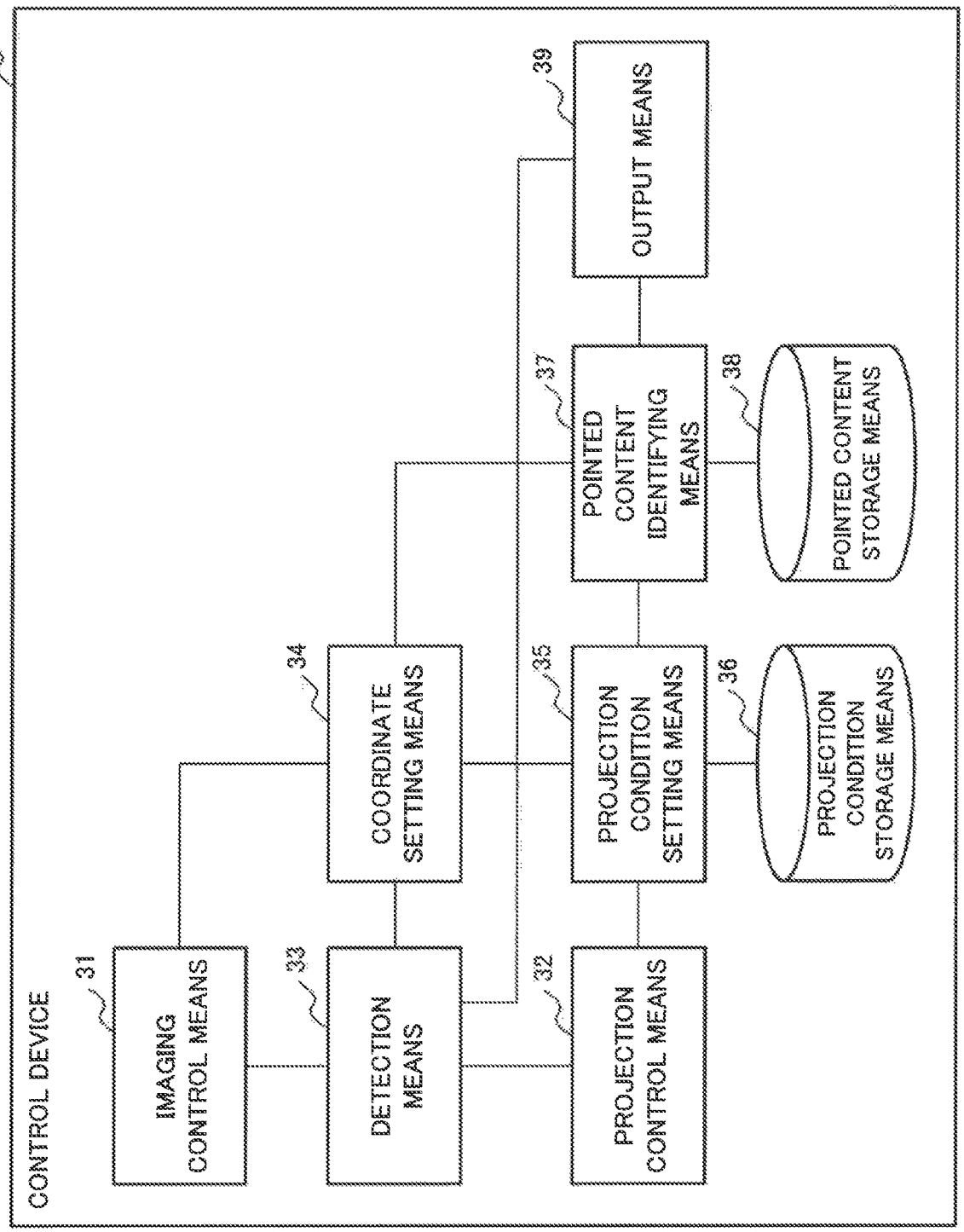
FIG. 3 is a block diagram illustrating a configuration of a control device included in the information input device according to the first example embodiment of the present invention.

FIG. 3 is a block diagram illustrating a configuration of the control device 30. As illustrated in FIG. 3, the control device 30 includes an imaging control means 31, a projection control means 32, a detection means 33, a coordinate setting means 34, a projection condition setting means 35, a projection condition storage means 36, a pointed content identifying means 37, a pointed content storage means 38, and an output means 39. Note that, in FIG. 3, a portion where lines connecting among blocks intersect with each other is not connected to each other.

The imaging control means 31 controls the imaging device 10 to capture a projection range, and acquires image data of the projection range. The imaging control means 31 outputs the acquired image data to the detection means 33.

The projection control means 32 controls the projection device 20 in such a way that projection light is projected onto a projection body located within a projection range depending on a projection condition set by the projection condition setting means 35. A projection condition is a control condition for projecting an acquired pattern onto a projection body at an appropriate timing.

The detection means 33 acquires image data of a projection range from the imaging control means 31, and detects a projection body and a pointing body within the projection range from the acquired image data. The detection means 33 outputs, to the coordinate setting means 34 and the output means 39, various designation signals associated with a detection status of a projection body and a pointing body.

The detection means 33 detects a projection body from image data captured within a projection range. When detecting a projection body in image data, the detection means 33 outputs, to the coordinate setting means 34, a designation signal (a projection coordinate system setting designation signal: also referred to as a first designation signal) designating to set a coordinate system (projection coordinate system) associated with the projection body.

The detection means 33 detects a state that a pointing body is located in an upper area of a projection body. The detection means 33 extracts a pointing portion being a part of a pointing body. The detection means 33 outputs, to the coordinate setting means 34, a signal (a pointing coordinate setting signal; a second designation signal) designating to set a coordinate on an extracted pointing portion.

Then, when detecting that the projection body and the pointing body are away from each other, the detection means 33 outputs, to the output means 39, an input information output designation signal (third designation signal) designating to output input information selected by the projection body at the point of time.

Specifically, the detection means 33 detects a projection body and a pointing body located in a projection range from image data, and outputs a designation signal associated with a detection state of the projection body and the pointing body.

The coordinate setting means 34 acquires image data from the imaging control means 31, and sets coordinate information relating to a projection body and a pointing body within image data in accordance with a designation signal from the detection means 33. The coordinate setting means 34 outputs the set coordinate information to the projection condition setting means 35 or the pointed content identifying means 37.

When receiving a projection coordinate system setting designation signal (first designation signal), the coordinate setting means 34 sets a projection coordinate system in accordance with a projection body. The coordinate setting means 34 outputs set projection coordinate system data to the projection condition setting means 35.

Further, when receiving a pointing coordinate setting signal (second designation signal), the coordinate setting means 34 sets a position coordinate (pointing coordinate) of a pointing portion in the projection coordinate system. The coordinate setting means 34 outputs pointing coordinate data to the pointed content identifying means 37.

The projection condition setting means 35 sets a projection condition in the projection device 20, based on information acquired from the coordinate setting means 34 or the pointed content identifying means 37.

When acquiring projection coordinate system data from the coordinate setting means 34, the projection condition setting means 35 sets, in the projection device 20, a projection condition for displaying, on a projection body, display information such as an UI associated with the acquired projection coordinate system data. The projection condition setting means 35 acquires a projection condition stored in the projection condition storage means 36, and outputs the acquired projection condition to the projection control means 32.

The projection condition setting means 35 acquires, from the projection condition storage means 36, a pattern associated with display information to be displayed on a projection body. For example, when the projection device 20 uses a phase modulator element, a pattern associated with display information is a phase distribution.

The projection condition setting means 35 generates a projection condition, and outputs the generated projection condition to the projection control means 32. A projection condition includes a light source control condition and an image control condition to be described later.

The projection condition setting means 35 generates a light source control condition indicating what timing and what degree of output of light is emitted from the projection device 20. A light source control condition is a condition for controlling a timing at which a light source included in the projection device 20 emits light, and corresponds to a condition for controlling a timing at which display information is displayed. The projection condition setting means 35 outputs a generated light source control condition to the projection control means 32.

Further, the projection condition setting means 35 generates an image control condition indicating at what timing and what piece of display information is displayed on a projection body. An image control condition corresponds to a condition for controlling an image generation element (not illustrated) included in the projection device 20. The projection condition setting means 35 outputs a generated image control condition to the projection control means 32.

For example, when the projection device 20 includes a phase modulator element, the projection condition setting means 35 generates, as an image control condition, a modulator element control condition indicating at what timing and what pattern is displayed on a display part of a spatial light modulator element. A modulator element control condition is a condition for displaying a pattern associated with display information on a display part of a spatial light modulator element at an appropriate timing. A timing at which a pattern associated with display information is displayed on a display part of a spatial light modulator element is synchronized with a driving timing of a light source included in a light source control condition.

The projection condition storage means 36 stores a projection condition (a light source control condition and an image control condition) for controlling the projection device 20 by the projection control means 32.

The projection condition storage means 36 stores a light source control condition for displaying a UI or display information such as a number, a character, and a symbol on a projection body at an appropriate timing. Further, the projection condition storage means 36 stores an image control condition for displaying a UI or display information such as a number, a character, and a symbol on a projection body. For example, when the projection device 20 uses a phase modulator element, the projection condition storage means 36 stores a phase distribution associated with display information.

The pointed content identifying means 37 acquires a position coordinate (pointing coordinate) of a pointing portion from the coordinate setting means 34. The pointed content identifying means 37 acquires, from the pointed content storage means 38, an item associated with a position coordinate of a projection coordinate system. The pointed content identifying means 37 identifies a pointed content on a UI by associating an item associated with a position coordinate of a projection coordinate system with a pointing coordinate. Specifically, the pointed content identifying means 37 identifies that a pointed content set at a position coordinate most proximate to a specified pointing coordinate is selected from among a position coordinate at which a pointed content is set.

The pointed content identifying means 37 designates the projection condition setting means 35 to set a projection condition for forming an identified pointed content on a projection body.

The pointed content storage means 38 stores a table or a list in which items associated with position coordinates of a projection coordinate system are summarized. Specifically, the pointed content storage means 38 stores information in which a pointed content is associated with at least one position coordinate on a projection body.

When receiving an input information output designation signal (third designation signal) from the detection means 33, the output means 39 acquires a pointed content at the point of time from the pointed content identifying means 37. The output means 39 outputs the acquired pointed content to the communication device 40, as input information.

Specifically, the control device 30 detects a target entering a projection range, based on a feature of the target (a projection body and a projection prohibited body), which is included in image data generated by controlling the imaging device 10. Note that a target includes a projection body being a target for light projection, and a projection prohibited body for which light projection is prohibited. Further, a feature of a target is a shape, a color, or the like of a target. For example, when a projection body is a hand palm, the control device 30 detects a hand palm being a projection body, based on a feature such as a shape or a color. Further, when a projection prohibited body is a face, the control device 30 detects a face being a projection prohibited body, based on a feature such as a shape or a color. Therefore, in the present example embodiment, it is possible to prevent projection of light onto a projection prohibited body being a target for which projection of projection light is prohibited.

When detecting a projection prohibited body, the control device 30 controls the projection device 20 not to project light onto the projection prohibited body. When detecting a projection body, the control device 30 controls the projection device 20 to project, onto the projection body, projection light for displaying display information for which an input is received. Further, when detecting a projection body and a projection prohibited body in a projection range, the control device 30 controls the projection device 20 in such a way that light is not projected onto the projection prohibited body, and projection light is projected onto the projection body. Note that, when detecting a projection prohibited body in a projection range, the control device 30 may control the projection device 20 to stop projection, regardless of presence or absence of a projection body.

Then, the control device 30 detects that a pointing body enters an upper area of a projection body, based on image data. The control device 30 controls the communication device 40 in such a way that input information determined based on a positional relationship between display information displayed on a projection body, and a pointing portion included in a pointing body is transmitted to the outside.

Herein, an internal configuration of the detection means 33 and the coordinate setting means 34 included in the control device 30 is described with reference to the drawings.

[Detection Means]

Figure 4:
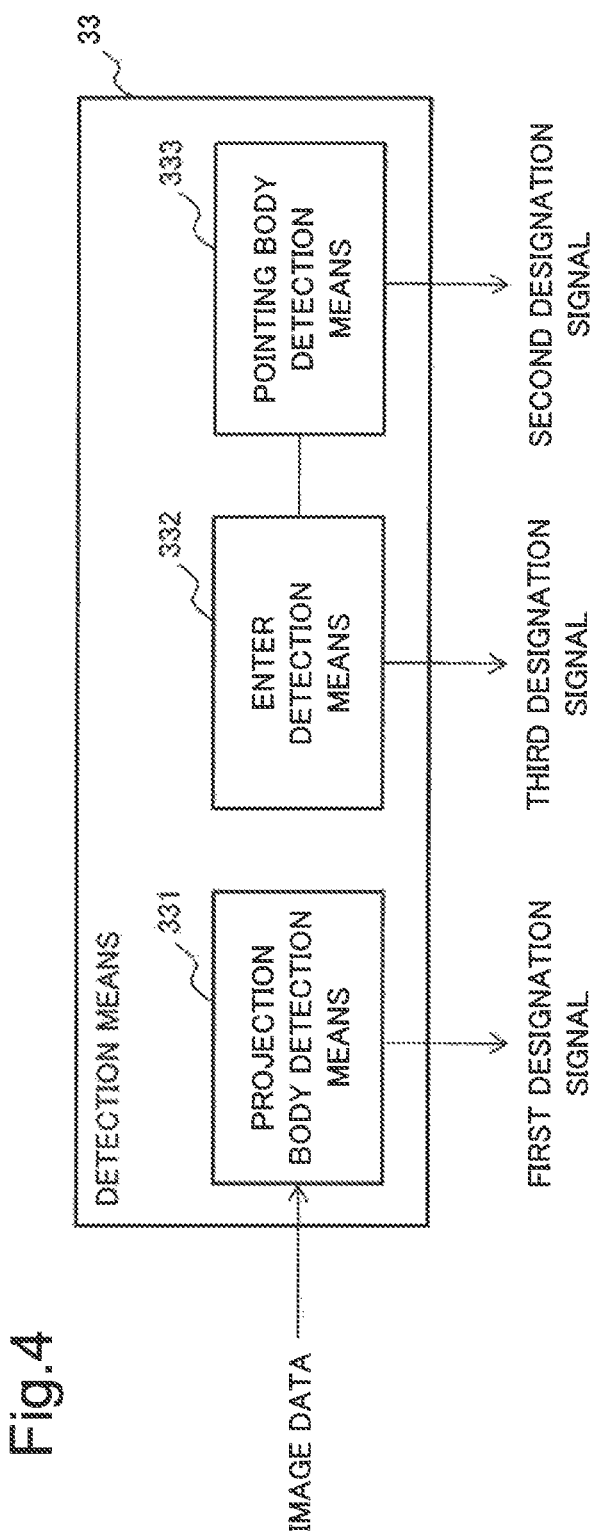
FIG. 4 is a block diagram illustrating a configuration of a detection means of the control device included in the information input device according to the first example embodiment of the present invention.

FIG. 4 is a block diagram including an internal configuration of the detection means 33 included in the control device 30. The detection means 33 includes a projection body detection means 331, an enter detection means 332, and a pointing body detection means 333.

The projection body detection means 331 detects a projection body on image data by using a feature such as a shape or a color. When detecting a projection body in image data acquired by capturing a projection range, the projection body detection means 331 outputs, to the coordinate setting means 34, a projection coordinate system setting designation signal (first designation signal) designating to set a coordinate system on the projection body. For example, the projection body detection means 331 detects a projection body located within a projection range in terms of a shape or a color.

Further, the projection body detection means 331 detects a projection prohibited body on image data by using a feature such as a shape or a color. When detecting a projection prohibited body, the projection body detection means 331 outputs, to the coordinate setting means 34, a first designation signal including a designation not to set a projection coordinate system on the projection prohibited body.

The enter detection means 332 detects a positional relationship between a projection body and a pointing body. Specifically, the enter detection means 332 detects a state that a pointing body enters above a projection body and the pointing body is located in an upper area of the projection body, and a state that the pointing body is not located in the upper area of the projection body.

The enter detection means 332 detects a state that a pointing body enters above a projection body, and the pointing body is located in an upper area of the projection body. In the present example embodiment, a point of time when a pointing body is located in an upper area of a projection body is regarded as a point of time when input by the pointing body is started. For example, when an area of a target object to be detected as a projection body rapidly increases, or a shape thereof rapidly changes, the enter detection means 332 detects that a pointing body is located in an upper area of the projection body. When detecting that a pointing body is located in an upper area of a projection body, the enter detection means 332 designates the pointing body detection means 333 to extract the pointing body. Further, in the present example embodiment, a state that a pointing body touches a projection body and is located on the projection body is included in a state that a pointing body is located in an upper area of a projection body. In the following, when a pointing body does not overlap display information displayed on a projection body, it may be regarded that the pointing body and the projection body touch each other in a state that the pointing body is located in an upper area of the projection body.

The pointing body detection means 333 extracts a pointing body in response to a designation of the enter detection means 332. The pointing body detection means 333 outputs, to the coordinate setting means 34, a pointing coordinate setting signal (second designation signal) designating to set a coordinate on a pointing portion included in the extracted pointing body.

Further, when detecting that a pointing body is deviated from above a projection body, the enter detection means 332 outputs, to the output means 39, an input information output designation signal (third designation signal) designating to output input information selected by the projection body at the point of time. In the present example embodiment, it is assumed that a projection body and a pointing body are away from each other at a point of time when the pointing body is not located in an upper area of the projection body. For example, when an area rapidly decreases, or a shape rapidly changes, or a number of targets increases from a state that a projection body and a pointing body touch each other, the enter detection means 332 detects that the pointing body is no longer located in an upper area of the projection body.

Figure 5:
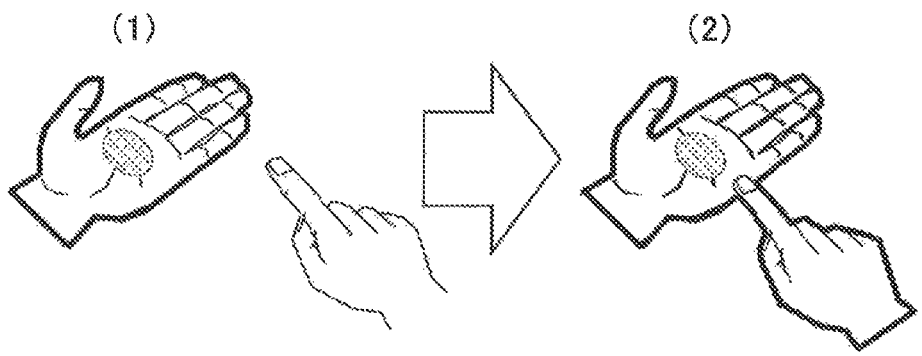
FIG. 5 is a conceptual diagram illustrating an example in which a state that a pointing body is located in an upper area of a projection body is detected by the information input device according to the first example embodiment of the present invention.
Figure 6:
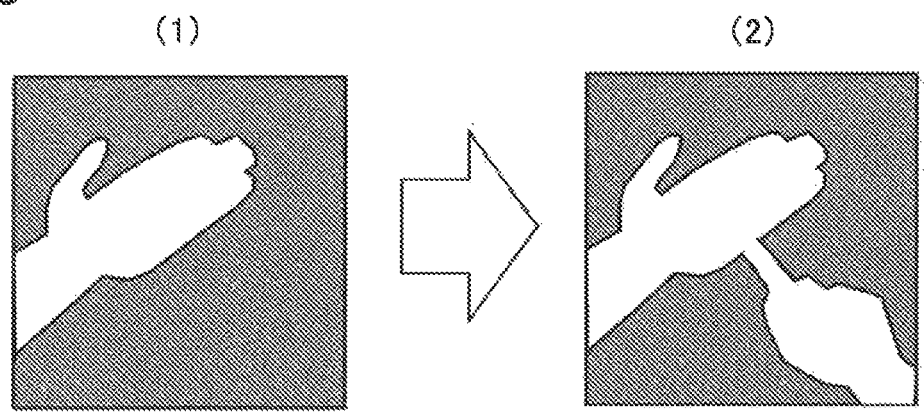
FIG. 6 is a conceptual diagram illustrating an example in which a state that a pointing body is located in an upper area of a projection body is detected by the information input device according to the first example embodiment of the present invention.

FIGS. 5 and 6 are conceptual diagrams illustrating an example in which the enter detection means 332 detects that a finger being a pointing body is located in an upper area of a hand palm being a projection body.

FIG. 5 is a conceptual diagram of an image of a state (state 1) that projection light indicating that information input is enabled is projected onto a hand palm, and a state (state 2) that a finger is located in an upper area of a hand palm for which information input is enabled. FIG. 6 is a diagram in which the image of FIG. 5 is binarized, and illustrating a portion corresponding to a hand in white, and illustrating the other portion in black. For example, the enter detection means 332 detects a skin color of a human body portion, and acquires data as illustrated in FIG. 6 by painting the skin color portion in white and the other portion in black.

When the state 1 and the state 2 in FIG. 6 are compared, in the state 2, an area of a white portion increases. Since an area of a white portion monitored in the state 1 rapidly increases, it can be detected that a finger is located in an upper area of a hand palm. Contrary to this, when an area of a white portion decreases, it can be detected that a hand palm and a finger are away from each other. Note that FIG. 6 illustrates an example in which a positional relationship between a projection body and a pointing body is detected in terms of an increase or a decrease in area. Alternatively, a positional relationship between a projection body and a pointing body may be detected by detecting a change in shape of a white portion or a number of white portions.

The pointing body detection means 333 outputs, to the coordinate setting means 34, a pointing coordinate setting signal (second designation signal) designating to set a coordinate on a pointing portion included in a pointing body, in response to a designation of the enter detection means 332. For example, when a finger is a pointing body, the detection means 33 extracts a fingertip, a nail, or the like. A portion to which input is actually added to a UI is a ball of a fingertip and its periphery. The detection means 33 outputs, to the coordinate setting means 34, a pointing coordinate setting signal (second designation signal) in order to set a coordinate of a position (pointing portion) corresponding to a ball of a finger to be estimated from an extracted fingertip, an extracted nail, or the like. For example, an area of a circle including a detected nail is set, and it is assumed that a center of the circle is a position of a pointing portion.

Figure 7:
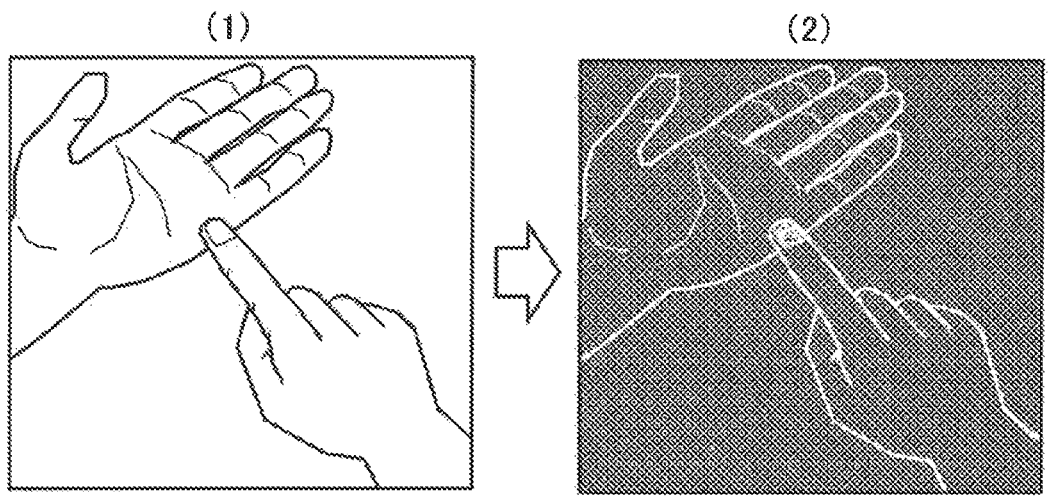
FIG. 7 is a conceptual diagram illustrating an example in which a pointing portion included in a pointing body located on a projection body is detected by the information input device according to the first example embodiment of the present invention.

FIG. 7 is a conceptual diagram illustrating an example in which a state that a finger is located in an upper area of a hand palm is detected. FIG. 7 illustrates a conceptual diagram of image data (image 1) captured in a state that a finger is located in an upper area of a hand palm, and data (image 2) in which edge detection processing is applied to the image data (image 1). When edge detection processing is applied to image data including a fingertip, an edge density of a nail portion increases. Therefore, detecting a portion having a large edge density as compared with the other portion as a nail enables to estimate a position (pointing portion) of a ball of a fingertip from a position of the nail. Note that a position of a pointing portion may be specified by a method other than edge detection. For example, a fingertip may be detected, based on a shape of a fingertip, wrinkles of a finger, or the like.

[Coordinate Setting Means]

Figure 8:
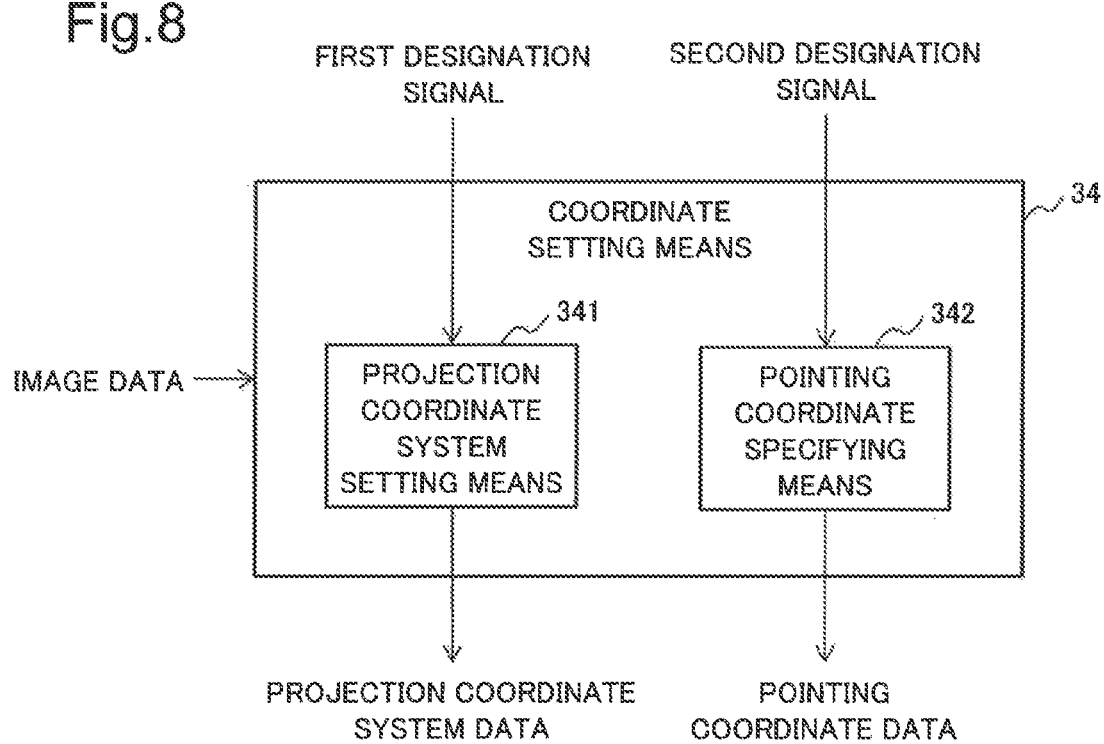
FIG. 8 is a block diagram illustrating a configuration of a coordinate setting means of the control device included in the information input device according to the first example embodiment of the present invention.

FIG. 8 is a block diagram including an internal configuration of the coordinate setting means 34 included in the control device 30. The coordinate setting means 34 includes a projection coordinate system setting means 341 and a pointing coordinate specifying means 342.

When acquiring image data from the imaging control means 31, and receiving a projection coordinate system setting designation signal (first designation signal) from the detection means 33, the projection coordinate system setting means 341 sets a coordinate system (projection coordinate system) in accordance with a projection body. Further, when a designation not to set a projection coordinate system on a projection prohibited body is included in a first designation signal, the projection coordinate system setting means 341 sets a projection coordinate system in such a way that light is not projected onto the projection prohibited body. The projection coordinate system setting means 341 outputs projection coordinate system data set for the projection body to the projection condition setting means 35.

The pointing coordinate specifying means 342 acquires image data from the imaging control means 31. When receiving a pointing coordinate setting signal (second designation signal), the pointing coordinate specifying means 342 analyzes the image data, and specifies a position coordinate (pointing coordinate) of a pointing portion in a projection coordinate system to be set for a projection body. For example, when a finger is a pointing body, the coordinate setting means 34 specifies a coordinate of a position (pointing portion) corresponding to a ball of a fingertip to be estimated from a fingertip, a nail, or the like. The pointing coordinate specifying means 342 outputs the specified pointing coordinate data to the pointed content identifying means 37.

Figure 9:
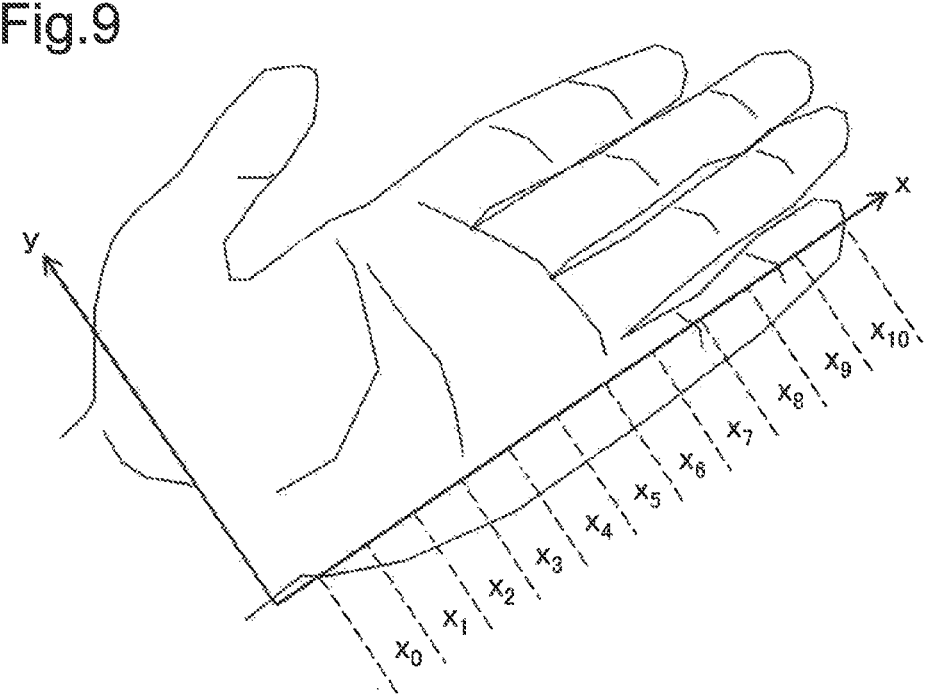
FIG. 9 is a conceptual diagram illustrating an example of a coordinate to be set on a projection body by the information input device according to the first example embodiment of the present invention.

FIG. 9 is an example of a projection coordinate system to be set, when a hand palm is set as a projection body. In the example of FIG. 9, a two-dimensional coordinate system is set by using one of positions of a hand palm as a reference. Note that, although a projection coordinate system is set in accordance with a hand palm, after the setting, the projection coordinate system is fixed to an image acquired by capturing a projection range.

For example, the projection coordinate system setting means 341 sets an x-coordinate on a side of a pinky finger of a hand, and sets a y-coordinate extending from one point on the x-coordinate toward a thumb. Then, the projection coordinate system setting means 341 sets pointing coordinates ($x_0$ to $x_{10}$) on the x-axis. The projection coordinate system setting means 341 outputs set projection coordinate system data to the projection condition setting means 35.

(Operation)

Next, an operation of the information input device 1 according to the present example embodiment is described with reference to the drawings. First, a typical operation example of the information input device 1 of the present example embodiment is described by using a conceptual diagram. FIG. 10 is a conceptual diagram illustrating an example of an information input method in the present example embodiment. FIG. 10 illustrates the following input procedure.

(1) The information input device 1 detects a projection body (hand palm), and projects light indicating that input preparation is completed onto the detected projection body.

(2) The information input device 1 detects a state that a pointing body (finger) is located in an upper area of the projection body, and projects, onto the projection body, projection light for forming an image in accordance with a pointing coordinate of a pointing portion included in the pointing body.

(3) The information input device 1 detects that a position of the pointing portion on the projection body changes, and projects, onto the projection body, projection light for forming an image in accordance with the position of the pointing portion.

(4) The information input device 1 detects that the pointing body is deviated from an upper area of the projection body, and outputs information selected by the pointing portion as input information.

Next, an operation of the information input device of the present example embodiment is described by using a flowchart. FIGS. 11 to 13 are flowcharts illustrating an operation of the information input device 1 of the present example embodiment.

FIG. 11 is a flowchart illustrating an overall operation of the information input device 1. In FIG. 11, the information input device 1 is described as an operation subject.

In FIG. 11, first, the information input device 1 detects a projection body located within a projection range (Step S11).

The information input device 1 executes projection condition setting processing of setting a projection condition for projecting projection light onto the projection body (Step S12). Projection condition setting processing will be described later by using FIG. 12.

The information input device 1 projects projection light for forming, onto the projection body, display information indicating that information input is enabled (Step S13).

The information input device 1 detects a state that a pointing body is located in an upper area of the projection body (Step S14).

Herein, the information input device 1 executes pointed position specifying processing (Step S15). Pointed position specifying processing will be described later by using FIG. 13.

The information input device 1 projects projection light for forming, onto the projection body, display information associated with a pointed position by a pointing portion included in the pointing body (Step S16).

Herein, the information input device 1 determines whether the projection body and the pointing body are away from each other (Step S17). When the projection body and the pointing body are not away from each other (No in Step S17), the processing returns to Step S15. On the other hand, when the projection body and the pointing body are away from each other (Yes in Step S17), the information input device 1 determines that pointed information associated with a pointed position when the pointing body is away is input (Step S18).

Then, the information input device 1 outputs pointed information that is determined to be input, as input information (Step S19).

The foregoing is description relating to an overall operation of the information input device 1.

[Projection Condition Setting Processing]

FIG. 12 is a flowchart illustrating an operation relating to projection condition setting processing of the information input device. In FIG. 12, constituent elements of the information input device 1 are described as operation subjects.

In FIG. 12, first, the detection means 33 detects a shape or a position of a projection body within a projection range (Step S121).

The coordinate setting means 34 sets a projection coordinate system in accordance with the detected projection body (Step S122).

The projection condition setting means 35 outputs, to the projection control means 32, a projection condition for forming display information in a display range to be set on the projection body (Step S123).

The foregoing is description relating to projection condition setting processing of the information input device 1.

[Pointed Position Specifying Processing]

FIG. 13 is a flowchart illustrating an operation relating to pointed position specifying processing of the information input device 1. In FIG. 13, constituent elements of the information input device 1 are described as operation subjects.

In FIG. 13, first, the detection means 33 extracts a pointing body (Step S151).

The coordinate setting means 34 specifies a position coordinate (pointing coordinate) of a pointing portion (Step S152).

The projection condition setting means 35 outputs, to the projection control means 32, a projection condition for projecting projection light for forming display information associated with the specified pointing coordinate (Step S153).

The foregoing is description relating to pointed position specifying processing of the information input device 1.

[Imaging Device]

Next, the imaging device 10 of the information input device 1 is described with reference to the drawings. FIG. 14 is a block diagram illustrating a configuration of the imaging device 10. The imaging device 10 includes an imaging element 11, an image processing processor 13, an internal memory 15, and a data output circuit 17. An imaging device includes a function of a general digital camera.

The imaging element 11 is an element for capturing a predetermined imaging area, and acquiring imaging data of the imaging area. In the present example embodiment, a range including a projection body is set in an imaging area.

The imaging element 11 is a photoelectric conversion element formed by fabricating semiconductor components into an integrated circuit. The imaging element 11 is implementable by a solid-state imaging element such as a charge-coupled device (CCD) or a complementary metal-on-oxide-semiconductor (CMOS), for example. Generally, the imaging element 11 is constituted of an element for capturing light in a visible range. Alternatively, the imaging element 11 may be constituted of an element capable of capturing and detecting an electromagnetic wave such an infrared ray, an ultraviolet ray, an X-ray, a gamma ray, a radio wave, and a microwave.

The image processing processor 13 is an integrated circuit for performing image processing such as dark current correction, interpolation operation, color space conversion, gamma correction, aberration correction, noise reduction, and image compression with respect to imaging data captured by the imaging element 11 and converting to image data. Note that, when image information is output without being processed, the image processing processor 13 may be omitted.

The internal memory 15 is a storage element for temporarily storing image information that is not completely processed when image processing is performed by the image processing processor 13, and processed image information. Note that image information captured by the imaging element 11 may be constituted in such a way as to be temporarily stored in the internal memory 15. The internal memory 15 may be constituted of a general memory.

The data output circuit 17 outputs image data processed by the image processing processor 13 to the control device 30.

[Projection Device]

Next, the projection device 20 is described with reference to the drawings. FIG. 15 is a block diagram illustrating a configuration of the projection device 20 of the information input device 1. Further, FIG. 16 is a conceptual diagram illustrating a configuration example of an optical system included in the information input device 1.

As illustrated in FIG. 15, the projection device 20 includes a light source 21, a light source driving power supply 22, a spatial light modulator element 23, a modulator element driving means 24, and a projection optical system 25. Note that FIG. 15 is a conceptual diagram, and does not accurately illustrate a positional relationship among constituent elements, a radiation direction of light, and the like.

The light source 21 emits light 110 of a specific wavelength. For example, it is possible to use a laser light source as the light source 21. Light 110 to be emitted from the light source 21 is preferably coherent light in which phases are aligned. Generally, the light source 21 is configured to emit light in a visible range. Note that the light source 21 may be configured to emit light in a range other than a visible range, such as an infrared range or an ultraviolet range. Further, the light source 21 may be configured of a light emitting device other than a laser light source, such as a light emitting diode, an incandescent light bulb, and a discharge tube.

As illustrated in FIG. 16, light 110 emitted by the light source 21 becomes coherent light 110 by a collimator 210, and is incident on a display part of the spatial light modulator element 23. For example, configuring the light source 21 in such a way that light of a plurality of wavelengths is emitted enables to change a color of display information by changing a wavelength of light to be emitted from the light source 21. Further, configuring the light source 21 in such a way that light of different wavelengths is simultaneously emitted enables to display display information composed of a plurality of colors.

The light source driving power supply 22 (also referred to as a light source driving means) is a power supply for driving the light source 21 in response to control of the control device 30, and thereby causing the light source 21 to emit light.

The spatial light modulator element 23 displays a pattern for generating display information to be displayed in each display area on a display part of an own device in response to control of the modulator element driving means 24. In the present example embodiment, light 110 is radiated onto a display part of the spatial light modulator element 23 in a state that a predetermined pattern is displayed on the display part. The spatial light modulator element 23 emits reflected light (modulated light 130) of incident light 110 toward the projection optical system 25.

As illustrated in FIG. 16, in the present example embodiment, an incident angle of light 110 with respect to a display part of the spatial light modulator element 23 is set non-perpendicular. Specifically, in the present example embodiment, an emission axis of light 110 from the light source 21 is made oblique with respect to a display part of the spatial light modulator element 23. Making an emission axis of light 110 with respect to a display part of the spatial light modulator element 23 oblique enables to improve efficiency, since the light 110 is enabled to be incident on the display part of the spatial light modulator element 23 without using a beam splitter.

The spatial light modulator element 23 is implementable by a phase-modulation-type spatial light modulator element which receives incidence of coherent light 110 in which phases are aligned, and modulates a phase of the incident light 110. Since emission light from a projection optical system using the phase-modulation-type spatial light modulator element 23 is focus-free, it is not necessary to change a focal point for each projection distance, even when light is projected onto a display area set at a plurality of projection distances. Note that, as far as it is possible to display display information in each display area, the spatial light modulator element 23 may be an element of a type different from a phase modulation type. However, a phase-modulation-type element is preferable to implement a focus free function.

A phase distribution of display information to be displayed in each display area is displayed in a display part of the phase-modulation-type spatial light modulator element 23. In this case, modulated light 130 reflected on a display area of the spatial light modulator element 23 becomes an image such that a sort of diffraction grating forms an aggregation, and display information is formed in such a way that light diffracted by a diffraction grating is collected.

The spatial light modulator element 23 is implemented by a spatial light modulator element using a ferroelectric liquid crystal, a homogeneous liquid crystal, a vertical orientation liquid crystal, or the like, for example. Specifically, the spatial light modulator element 23 is implementable by a liquid crystal on silicon (LCOS). Further, the spatial light modulator element 23 may be implemented by a micro electro mechanical system (MEMS), for example.

In the phase-modulation-type spatial light modulator element 23, it is possible to concentrate energy at a portion of display information by operating the spatial light modulator element 23 to successively switch a display area onto which projection light is projected. Therefore, using the phase-modulation-type spatial light modulator element 23 enables to display display information brightly as compared with another method, as far as an output of a light source is the same.

The modulator element driving means 24 causes a display part of the spatial light modulator element 23 to display a pattern for generating display information to be displayed in each display area in response to control of the control device 30. The modulator element driving means 24 drives the spatial light modulator element 23 in such a way that a parameter that determines a difference between a phase of light 110 to be radiated onto a display part of the spatial light modulator element 23, and a phase of modulated light 130 to be reflected on a display part is changed.

A parameter that determines a difference between a phase of light 110 to be radiated onto a display part of the phase-modulation-type spatial light modulator element 23, and a phase of modulated light 130 to be reflected on a display part is, for example, a parameter relating to an optical characteristic such as a refractive index and a light path length. For example, the modulator element driving means 24 changes a refractive index of a display part by changing a voltage to be applied to a display part of the spatial light modulator element 23. Consequently, light 110 radiated onto a display part is diffracted based on a refractive index of a display part, as necessary. Specifically, a phase distribution of light 110 radiated onto the phase-modulationtype spatial light modulator element 23 is modulated depending on an optical characteristic of a display part. Note that a method for driving the spatial light modulator element 23 by the modulator element driving means 24 is not limited to an example described herein.

The projection optical system 25 projects modulated light 130 modulated by the spatial light modulator element 23 as projection light 150. As illustrated in FIG. 16, the projection optical system 25 includes a Fourier transform lens 251, an aperture 252, and a projection lens 253. Modulated light 130 modulated by the spatial light modulator element 23 is radiated as projection light 150 by the projection optical system 25. Note that, as far as it is possible to cause display information to be displayed in each display area, one of constituent elements of the projection optical system 25 may be omitted.

The Fourier transform lens 251 is an optical lens for forming, at a focal point nearby, an image to be formed when modulated light 130 reflected on a display part of the spatial light modulator element 23 is projected to infinity. In FIG. 16, a focal point is formed at a position of the aperture 252.

The aperture 252 has a function of blocking high-order light included in light collected by the Fourier transform lens 251, and specifying a display area. An opening portion of the aperture 252 is opened with a size smaller than an outermost periphery of a display area at a position of the aperture 252, and is set in such a way as to block a peripheral area of display information at the position of the aperture 252. For example, an opening portion of the aperture 252 is formed into a rectangular shape or a circular shape. The aperture 252 is preferably set at a focal point position of the Fourier transform lens 251. However, as far as it is possible to exhibit a function of cancelling high-order light, the aperture 252 may be deviated from a focal point position.

The projection lens 253 is an optical lens for enlarging and projecting light that is collected by the Fourier transform lens 251. The projection lens 253 projects projection light 150 in such a way that display information associated with a phase distribution input to the spatial light modulator element 23 is displayed in each display area.

When the information input device 1 is used for the purpose of projecting a line drawing such as a simple symbol, projection light 150 projected from the projection optical system 25 is not uniformly projected onto each display area, but is intensively projected onto a portion such as a character, a symbol, and a frame constituting display information. In such a case, since the information input device 1 substantially reduces an amount of emission of light 110, it is possible to suppress an entire output of light. Specifically, since the information input device 1 is constituted by the compact and low electric power light source 21, it is possible to lower an output of the light source driving power supply 22 for driving the light source 21, and it is possible to reduce entire electric power consumption.

Figure 17:
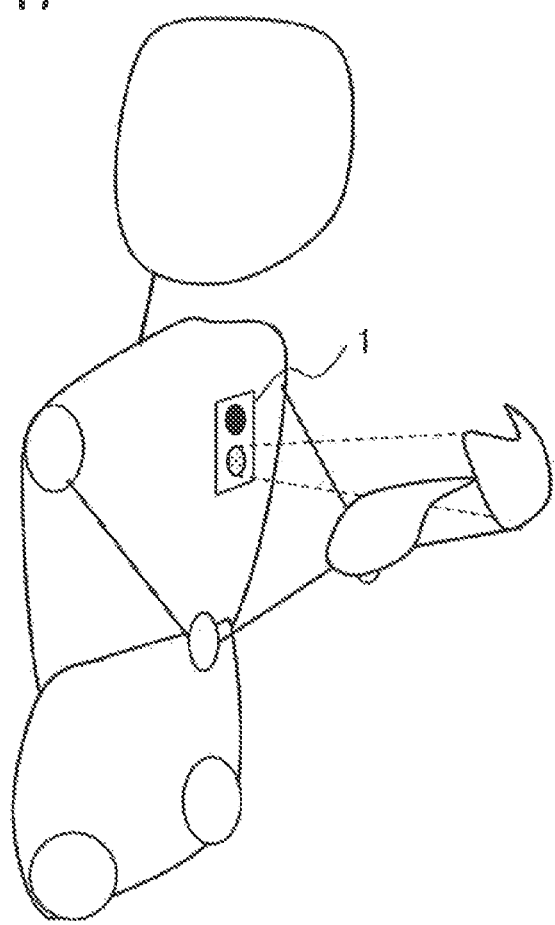
FIG. 17 is a conceptual diagram illustrating an example in which the information input device according to the first example embodiment of the present invention is worn.

As described above, since the information input device 1 of the present example embodiment is able to reduce entire electric power consumption, it is possible to miniaturize the entirety of the device. FIG. 17 is an example in which the information input device 1 of the present example embodiment is configured to be portable. As illustrated in FIG. 17, configuring the information input device 1 into a wearable type to be worn on a breast or the like enables to input information in any scene.

As described above, in the present example embodiment, information selected from a positional relationship between a projection body (hand palm) onto which display information is projected, and a pointing body (finger) for designating information is determined, and input of the selected information is determined when the pointing body is away from the projection body. Generally, in an operation such that a button displayed on a hand palm is pressed by a finger, it is necessary to know a position of the finger on the hand palm, and a distance between the hand palm and the finger in order to determine the pressing. Thus, color determination and distance determination were extremely difficult. In the method of the present example embodiment, however, it is easy to know a position of a finger on a hand palm, and a distance between the hand palm and the finger. Therefore, in the present example embodiment, selection and input of information are enabled regardless of a color and a distance, and robust input is enabled even when an imaging device and a hand are away from each other.

Features of an input method of the present example embodiment are summarized as follows.

(1) Contact of Both Hands Serves as a Switch.

Generally, when a hand is recognized, a depth sensor is used. When a depth sensor is not used, a color is used. However, when a hand palm is used as a projection body on which a UI is displayed, it is difficult to specify a pointed position, since a finger being a pointing body and the hand palm have a same color.

In the present example embodiment, a phenomenon that an area or a shape of a region acquired by joining a hand palm and a finger greatly changes, when the hand palm and the finger touch each other or are away from each other, is used in switching determination by using that the hand palm and the finger have a same color.

(2) An Alternative is Selected by Recognizing a Position of a Finger for Pointing or a Number of Fingers for Pointing.

In the present example embodiment, it is easy to recognize a position of a finger being a pointing body, or a number of fingers by analyzing an image of a hand palm being a projection body, based on a premise that a state of recognition of a person who inputs information is known.

(3) Selection is Recognized in Terms of a Duration when a Finger Stops.

In the present example embodiment, a position of a finger at a point of time when the entirety of both hands stops is analyzed in a state that both hands touch each other, and selected information is determined.

Further, in the present example embodiment, when a projection prohibited body is detected in a projection range, light is controlled not to impinge on the projection prohibited body. Therefore, in the present example embodiment, it is safe, since light is not projected onto a face of a user or the like, who inputs input information As described above, in the information input device according to the present example embodiment, any user is allowed to perform intuitive input processing safely in a scene where the input processing is necessary.

In the present example embodiment, a projection body entering a projection range is detected, and a pointing body entering an upper area of the projection body is detected, based on image data. Therefore, in the present example embodiment, it is possible to detect a position of a pointing body with respect to display information projected onto a projection body with a simplified configuration without using a depth sensor or the like, and it is possible to implement a UI with which a user is allowed to perform intuitive input processing.

Application Example

Figure 18:
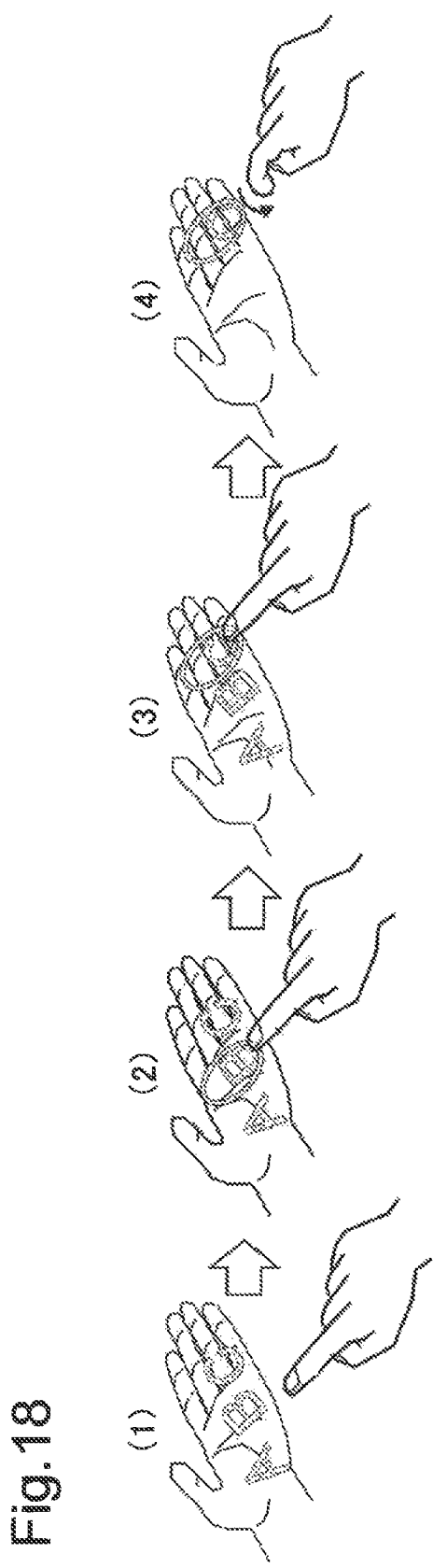
FIG. 18 is a conceptual diagram illustrating an example of the information input method using a user interface displayed by the information input device according to the first example embodiment of the present invention.
Figure 19:
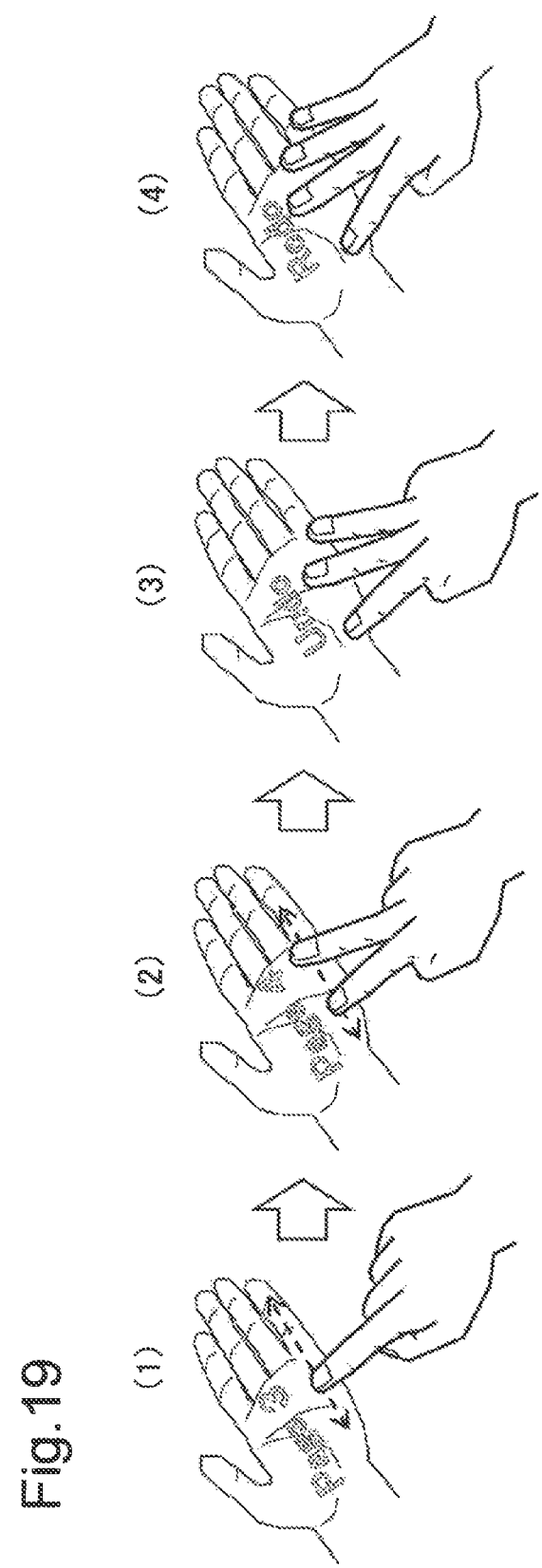
FIG. 19 is a conceptual diagram illustrating an example of the information input method using a user interface displayed by the information input device according to the first example embodiment of the present invention.

Herein, an application example of the information input device 1 of the present example embodiment is described by way of some examples. FIGS. 18 to 19 are conceptual diagrams illustrating an example of an application example to which the information input device 1 of the present example embodiment is applied. Note that the example of FIGS. 18 to 19 is an example, and does not limit the scope of the present example embodiment.

FIG. 18 is an example in which information displayed on a hand palm is selected by a finger.

First, the information input device 1 causes selection items (A, B, and C) to be displayed on a detected hand palm (1). When detecting that the hand palm and a finger touch each other, the information input device 1 causes an item associated with a position of the finger to be displayed in a state that the item is surrounded by a circle (2). The information input device 1 changes an item to be surrounded by a circle, as the finger moves (3). When the hand palm and the finger are away from each other, the information input device 1 outputs an item selected at the point of time as input information (4).

FIG. 19 is an example in which a meaning is imparted to a number of fingers touching a hand palm.

For example, when an input item is included in a number of pages, it is necessary to search within a page, and search over pages.

When being touched with one finger, the information input device 1 is operated in such a way as to scroll within a page (1). When being touched with two fingers, the information input device 1 is operated in such a way as to turn a page (2). When being touched with three fingers, this indicates that information that is input immediately before is cancelled (3). Further, when being touched with four fingers, this indicates that a content that is cancelled immediately before is input again (4).

In the example of FIG. 19, a meaning is imparted to a number of fingers. Alternatively, for example, a meaning may be imparted to an operation such that another finger touches or is away from a hand palm, while the hand palm being touched by a thumb.

Second Example Embodiment

Next, an information input device according to a second example embodiment of the present invention is described with reference to the drawings. In the present example embodiment, a method for facilitating detection of a pointing body, when display information to be projected onto a projection body, and the pointing body overlap each other, is described.

Figure 20:
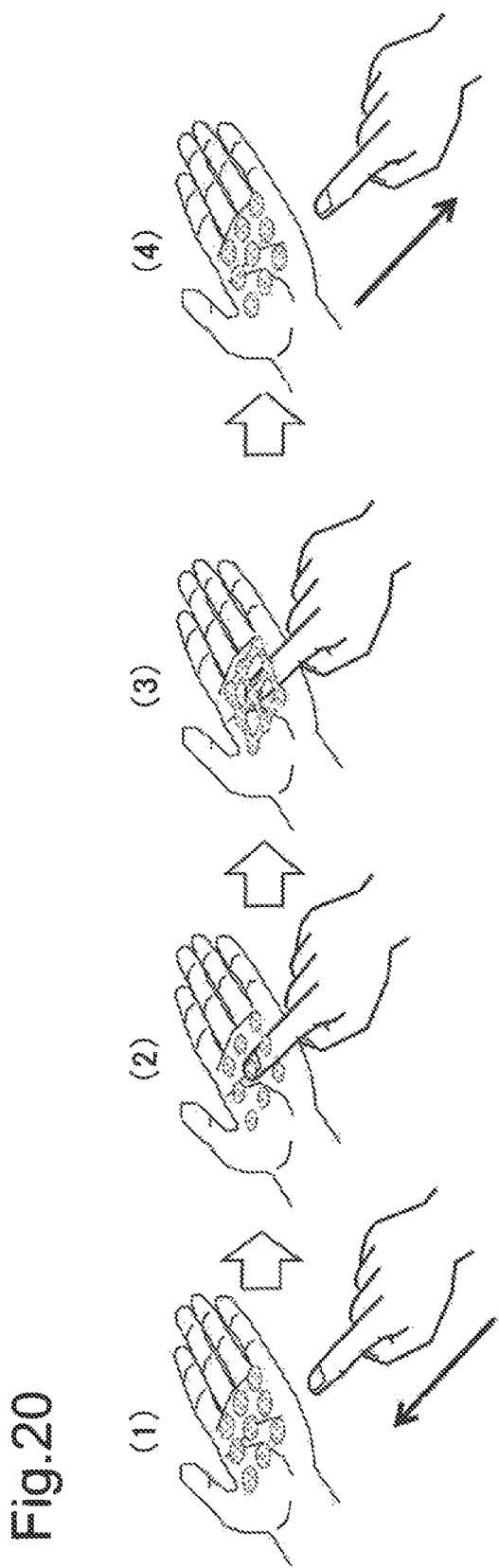
FIG. 20 is a conceptual diagram illustrating an example of an information input method using a user interface displayed by an information input device according to a second example embodiment of the present invention.

FIG. 20 is an example in which a numeric keypad displayed on a hand palm is selected. In the example of FIG. 20, holding a finger still on a hand palm is regarded as a selection switch.

First, the information input device causes a numeric keypad to be displayed on a detected hand palm (state 1). At this occasion, the information input device executes calibration by using a plurality of keys displayed on a hand palm. For example, the information input device executes calibration by performing image processing with respect to image data acquired by capturing display information projected onto a projection body by using a method such as pattern matching. In the example of FIG. 20, the information input device performs image processing with respect to image data acquired by capturing a projection range including display information (a plurality of keys) displayed on a projection body, and replaces positions of the plurality of keys for coordinates on the image data.

When detecting a state that a finger is located in an upper area of a hand palm, the information input device tracks motion of the finger. Then, the information input device detects a pointed position of the finger at a point of time when the finger stops for a predetermined time (state 2). The information input device specifies a pointed position (pointing coordinate) by the finger on the image data. For example, even in a state that a finger is located in an upper area of a hand palm, the finger may not touch the hand palm until a key is selected. Therefore, in the present example embodiment, the information input device specifies a pointed position at a point of time when motion of the finger stops for a predetermined time.

The information input device recognizes a position of a key selected at a point of time when a finger stops for a predetermined period in a state that one of the keys is selected, and causes a mark indicating that a key operation is received to be displayed (state 3). The information input device determines, on the image data, that a key arranged at a position most proximate to a pointed position (pointing coordinate) of a pointing portion is selected. At this occasion, the information input device determines that a selected key is input. In the first example embodiment, an input is received at a point of time when a finger is away from a hand palm. On the other hand, in the present example embodiment, an input is received at a stage when a key selected by a finger can be specified.

When the finger is deviated from an upper area of the hand palm, the information input device causes a numeric keypad to be displayed on the hand palm again in order to receive a next input (state 4). Separating a hand palm and a finger from each other is an operation for inputting a selection item in the first example embodiment. In the present example embodiment, however, separating a hand palm and a finger from each other is an operation for switching display information to be displayed on the hand palm. Specifically, in the present example embodiment, Step S18 in the flowchart of FIG. 11 is not "input determination", but is "switching designation" of display information.

In the example of FIG. 20, when a finger points a key of a numeric keypad displayed on a hand palm (state 2), the finger is less likely to be detected, since image data indicating that display information and a position of the finger overlap each other are acquired. In view of the above, in the present example embodiment, detection of a finger is facilitated by the following procedure of FIG. 21.

Figure 21:
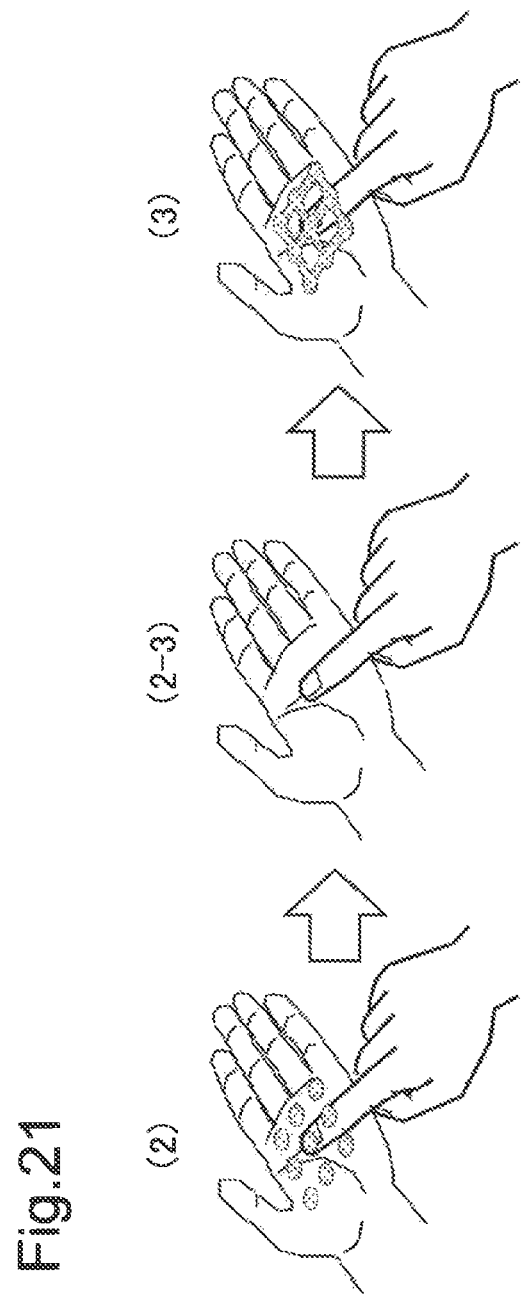
FIG. 21 is a conceptual diagram illustrating an example in which a pointing portion of a pointing body located on a projection body is detected in the second example embodiment of the present invention.

FIG. 21 is a conceptual diagram for describing an example in which the information input device detects a pointing body, when display information and a position of a finger overlap each other. As illustrated in FIG. 21, the information input device detects a fingertip by temporarily stopping projection of projection light in a state (state 2) that a pointing body is located in an upper area of a hand palm, and specifies a position (pointed position) designated by a pointing portion (state 2-3). Then, the information input device 1 causes a mark indicating that the specified pointed position is received to be displayed on the hand palm (state 3).

When projection of projection light in detecting a finger is continued, a position of a fingertip is less likely to be specified due to an influence of projection light. In the present example embodiment, however, in detecting a finger, finger detection is facilitated by temporarily stopping light projection as illustrated in the state 2-3.

[Pointed Position Specifying Processing]

Figure 22:
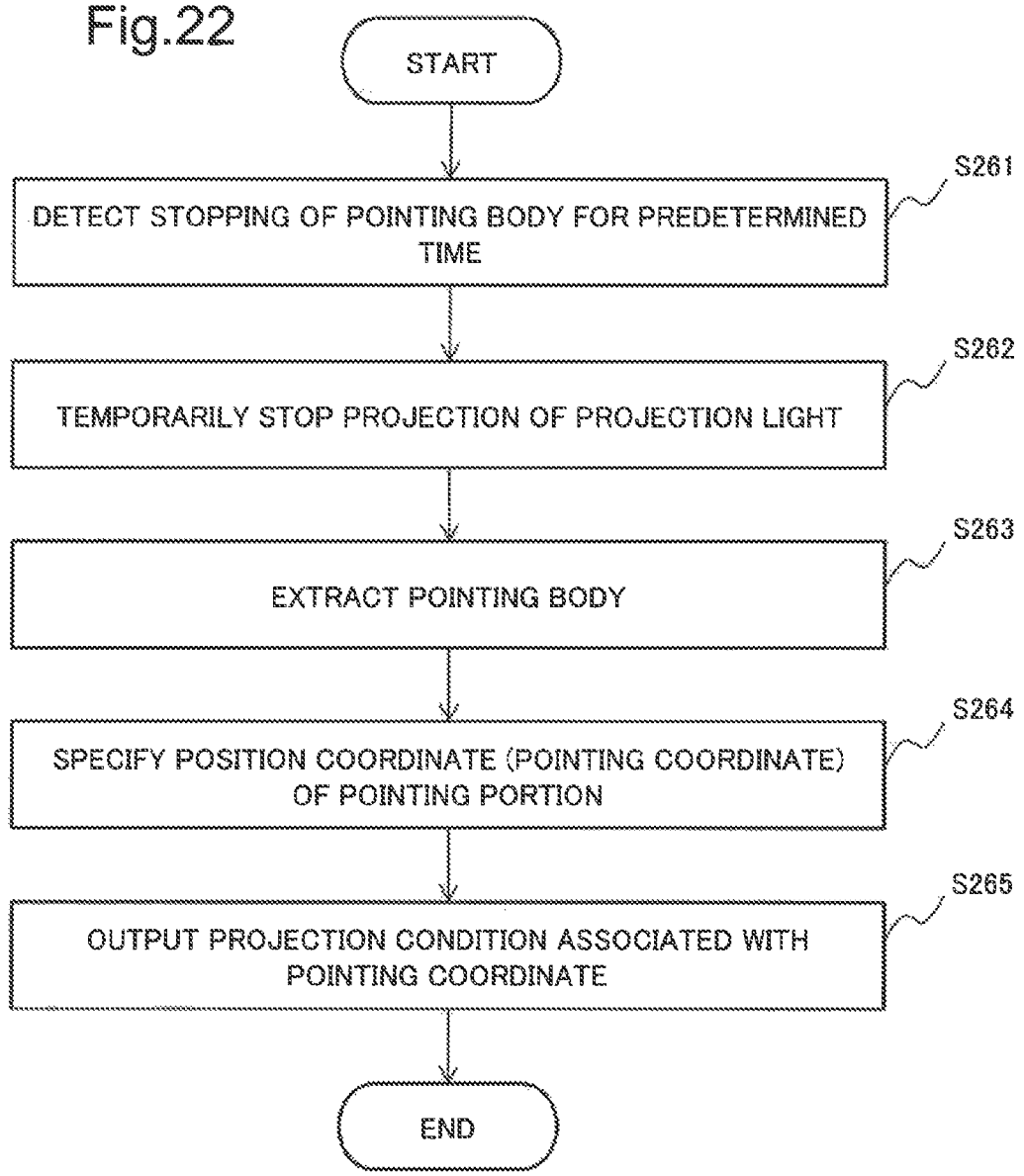
FIG. 22 is a flowchart illustrating pointed position specifying processing of the information input device according to the second example embodiment of the present invention.

FIG. 22 is a flowchart illustrating an operation relating to pointed position specifying processing of the information input device 1. In FIG. 22, constituent elements of the information input device 1 are described as operation subjects.

In FIG. 22, first, the detection means 33 detects that a pointing body stops for a predetermined time (Step S261). At this occasion, the detection means 33 outputs, to the projection control means 32, a stop designation signal designating to temporarily stop light projection.

Herein, the detection means 33 designates the projection control means 32 to temporarily stop light projection (Step S262).

The detection means 33 extracts the pointing body on a projection body (Step S263).

The coordinate setting means 34 specifies a position coordinate (pointing coordinate) of a pointing portion (Step S264).

The projection condition setting means 35 outputs, to the projection control means 32, a projection condition for projecting projection light for forming display information associated with the specified pointing coordinate (Step S265).

The foregoing is description relating to pointed position specifying processing of the present example embodiment. In the present example embodiment, it is assumed that stopping of a pointing body for a predetermined time is detected, and at the point of time, display information associated with a position (pointing coordinate) designated by a pointing portion is selected. At this occasion, in the present example embodiment, it is assumed that input information associated with display information displayed at a position of a pointing coordinate is input. In the present example embodiment, a more intuitive input operation is implementable by causing a pointing body to directly touch a UI displayed on a projection body.

Figure 23:
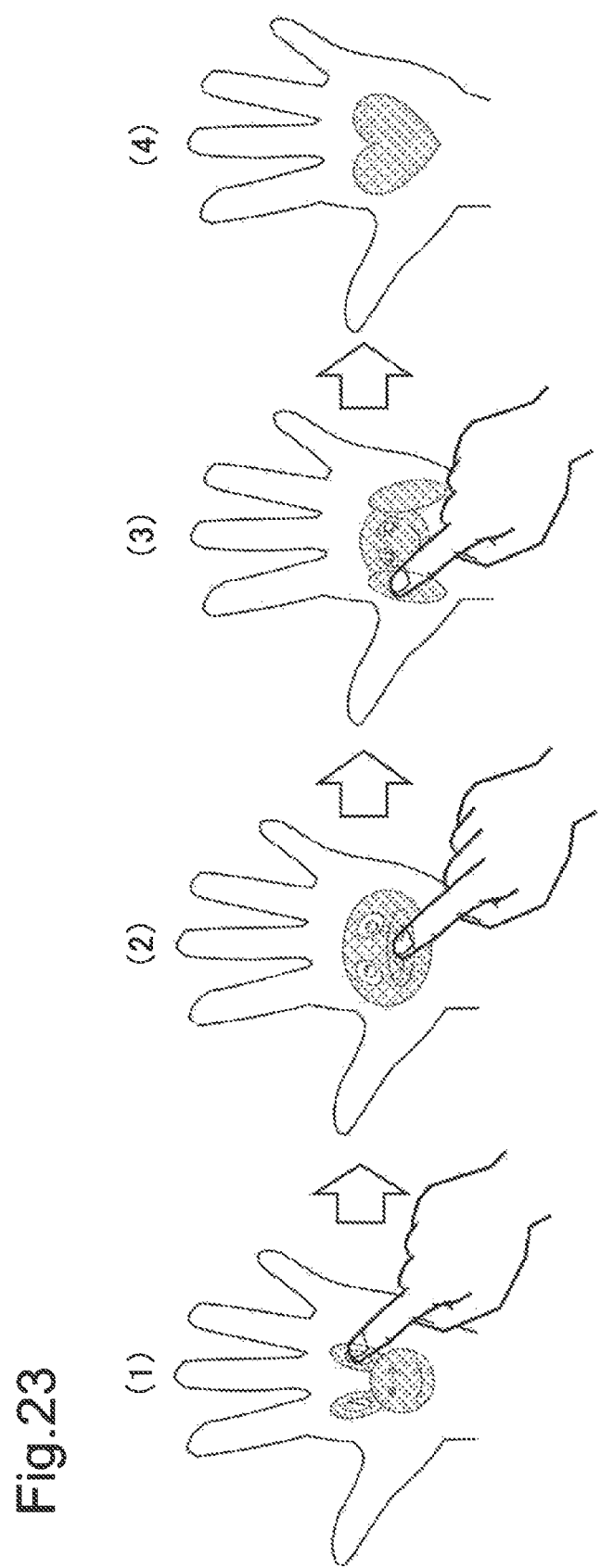
FIG. 23 is a conceptual diagram illustrating an example of an information input method according to the second example embodiment of the present invention.
Figure 24:
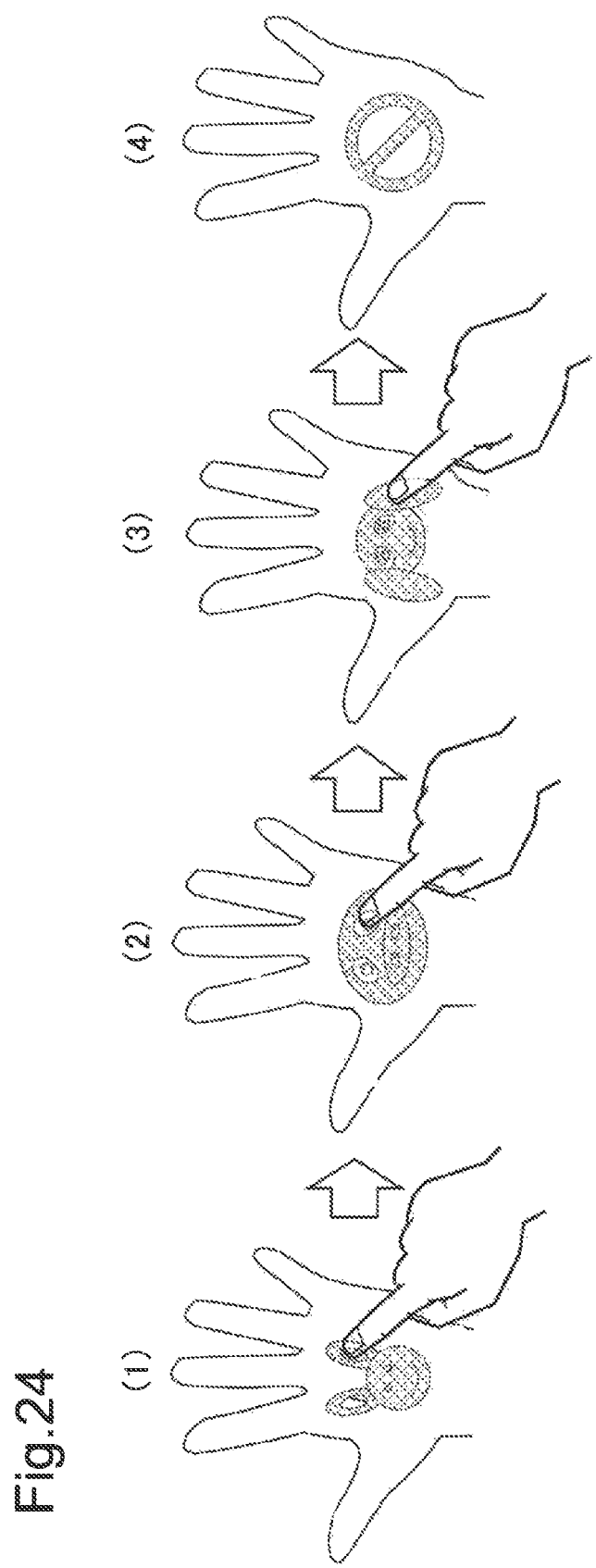
FIG. 24 is a conceptual diagram illustrating an example of the information input method according to the second example embodiment of the present invention.

Herein, an example in which not a number or a character, but a picture is used as a UI is described. FIGS. 23 and 24 are an example in which not a number or a character, but a picture is displayed on a hand palm. A child may not remember an order of numbers or emoticons, but may find it easy to remember an order of touching parts included in a picture. Note that the following description is made in terms of left and right positions when viewed from the plane of drawing.

FIG. 23 is an example in which an input order is correct. First, a target person touches the right ear of a first animal (1). Next, the target person touches the nose of a second animal (2). Next, the target person touches the left ear of a third animal (3). As illustrated in FIG. 23, when an input is performed in an order from 1 to 3, a heart mark indicating a correct answer is displayed (4).

FIG. 24 is an example in which an input order is incorrect. First, a target person touches the right ear of a first animal (1). Next, the target person touches the right eye of a second animal (2). Next, the target person touches the right ear of a third animal (3). As illustrated in FIG. 24, when an input is performed in an order from 1 to 3, a mark indicating an incorrect answer is displayed (4). Note that, FIG. 24 illustrates an example in which a prohibited sign or symbol is displayed, as a mark indicating an incorrect answer.

Using a method of the present example embodiment makes it easy for a target person to perform an input by directly touching a part of an animal displayed as a UI with a finger, as illustrated in FIGS. 23 and 24.

Third Example Embodiment

Next, an information input device according to a third example embodiment of the present invention is described with reference to the drawings. An information input device of the present example embodiment is different from that of the first example embodiment in terms of a configuration of a coordinate setting means. An information input device of the present example embodiment specifies a pointed position by using machine learning data. Note that, among configurations of the present example embodiment, detailed description on a configuration and an operation similar to those in the first example embodiment is omitted.

(Configuration)

Figure 25:
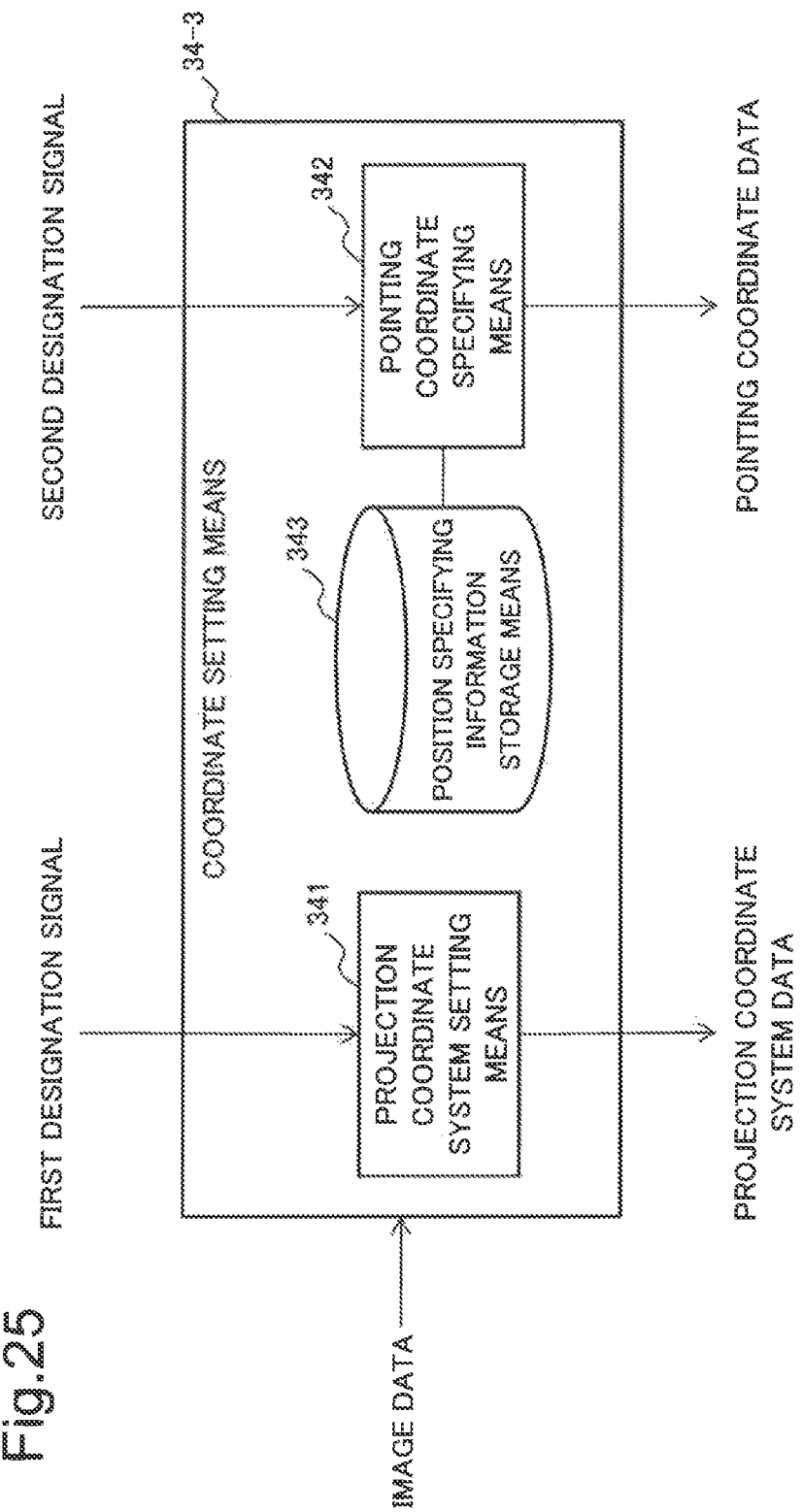
FIG. 25 is a block diagram illustrating a configuration of a coordinate setting means of an information input device according to a third example embodiment of the present invention.

FIG. 25 is a block diagram illustrating a configuration of a coordinate setting means 34-3 included in the information input device of the present example embodiment. The coordinate setting means 34-3 includes a position specifying information storage means 343, in addition to a projection coordinate system setting means 341 and a pointing coordinate specifying means 342. Specifically, the coordinate setting means 34-3 is different from the coordinate setting means 34 of the first example embodiment in a point that the position specifying information storage means 343 is included.

The position specifying information storage means 343 stores information for specifying a pointing coordinate of a pointing portion in a projection coordinate system set on a projection body. The position specifying information storage means 343 stores machine learning data for use when the pointing coordinate specifying means 342 specifies a pointed position by a pointing portion from image data. Machine learning data include an algorithm for specifying a pointed position of a pointing portion from image data indicating that a pointing body is located on a projection body. For example, about several thousands of pieces of image data are collected in advance, and a pointed position by a pointing portion is set in advance on these pieces of image data. For example, an approximately center of a nail of a finger located on a hand palm is set as a pointed position.

The pointing coordinate specifying means 342 specifies a pointed position by a pointing portion by using machine learning data stored in the position specifying information storage means 343. For example, when analyzing image data indicating that a finger is located on a hand palm by using machine learning data, the pointing coordinate specifying means 342 detects around a nail of the finger. For example, the pointing coordinate specifying means 342 sets a circle around a detected position of a nail, and sets a pointing coordinate at a center of the circle.

The pointed content identifying means 37 identifies that a pointed content set at a position coordinate most proximate to a specified pointing coordinate is selected from among a pointed coordinate at which the pointed content is set.

A projection condition setting means 35 outputs, to a projection control means 32, a projection condition for projecting projection light for forming display information associated with a specified pointing coordinate.

(Operation)

Figure 26:
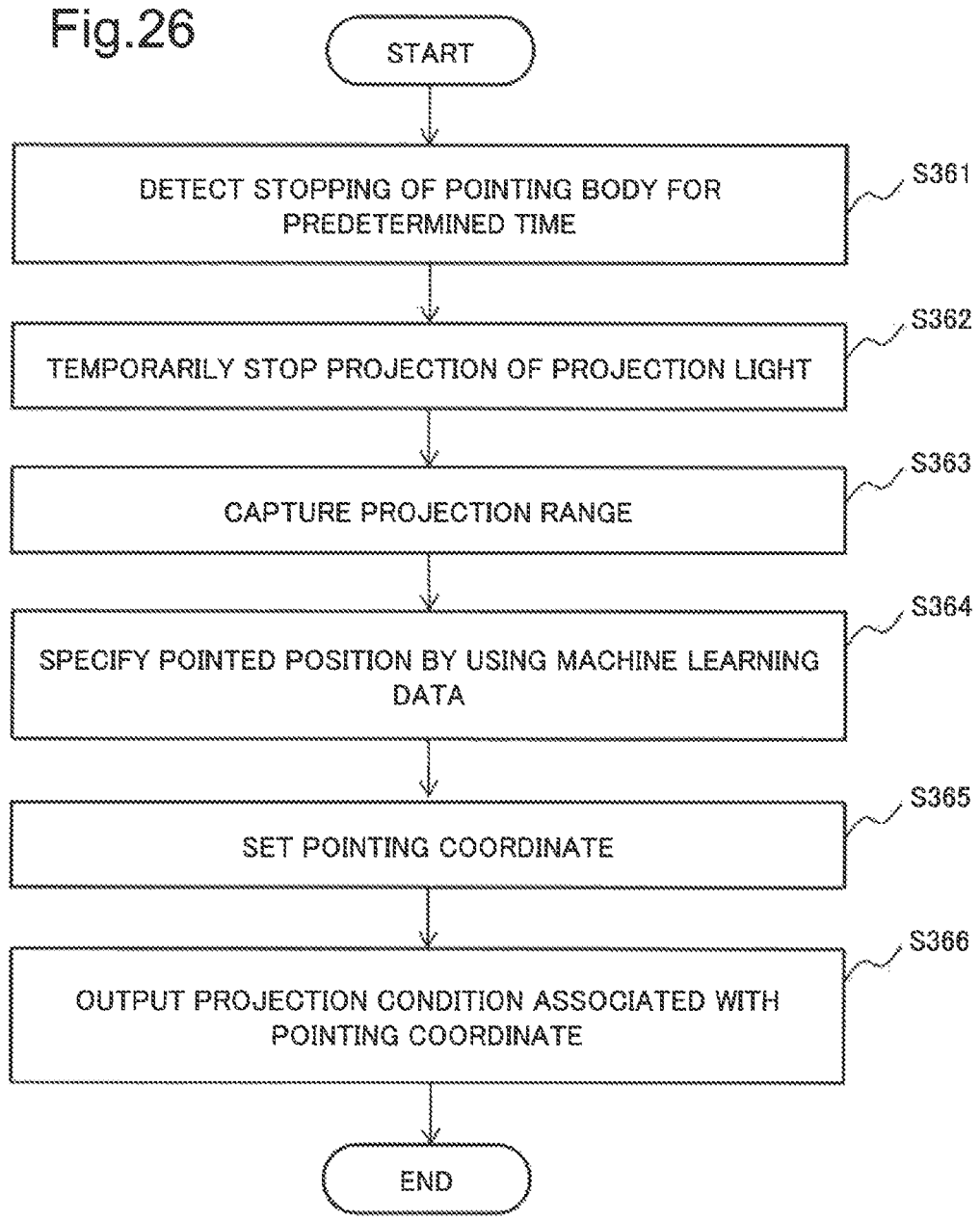
FIG. 26 is a flowchart illustrating pointed position specifying processing of the information input device according to the third example embodiment of the present invention.

Herein, an operation of the information input device of the present example embodiment is described with reference to the drawings. FIG. 26 is a flowchart illustrating a flow relating to pointed position specifying processing of an information input device of the present example embodiment. An operation of the information input device of the present example embodiment is different from that of the second example embodiment in terms of pointed position specifying processing (FIG. 13).

In FIG. 26, first, a detection means 33 detects that a pointing body stops for a predetermined time (Step S361).

At this occasion, the detection means 33 outputs, to the projection control means 32, a stop designation signal designating to temporarily stop light projection.

The projection control means 32 temporarily stops light projection in response to the stop designation signal (Step S362).

An imaging control means 31 captures a projection range in a state that light projection is stopped (Step S363).

The coordinate setting means 34-3 specifies a pointed position by a pointing portion on image data by using machine learning data stored in the position specifying information storage means 343 (Step S364).

The coordinate setting means 34-3 sets a pointing coordinate from the pointed position by the pointing portion (Step S365).

The projection condition setting means 35 outputs, to the projection control means 32, a projection condition for projecting projection light for forming display information associated with the specified pointing coordinate (Step S366).

The foregoing is description relating to projection condition setting processing of the information input device of the present example embodiment.

[Hybrid Processing]

Figure 27:
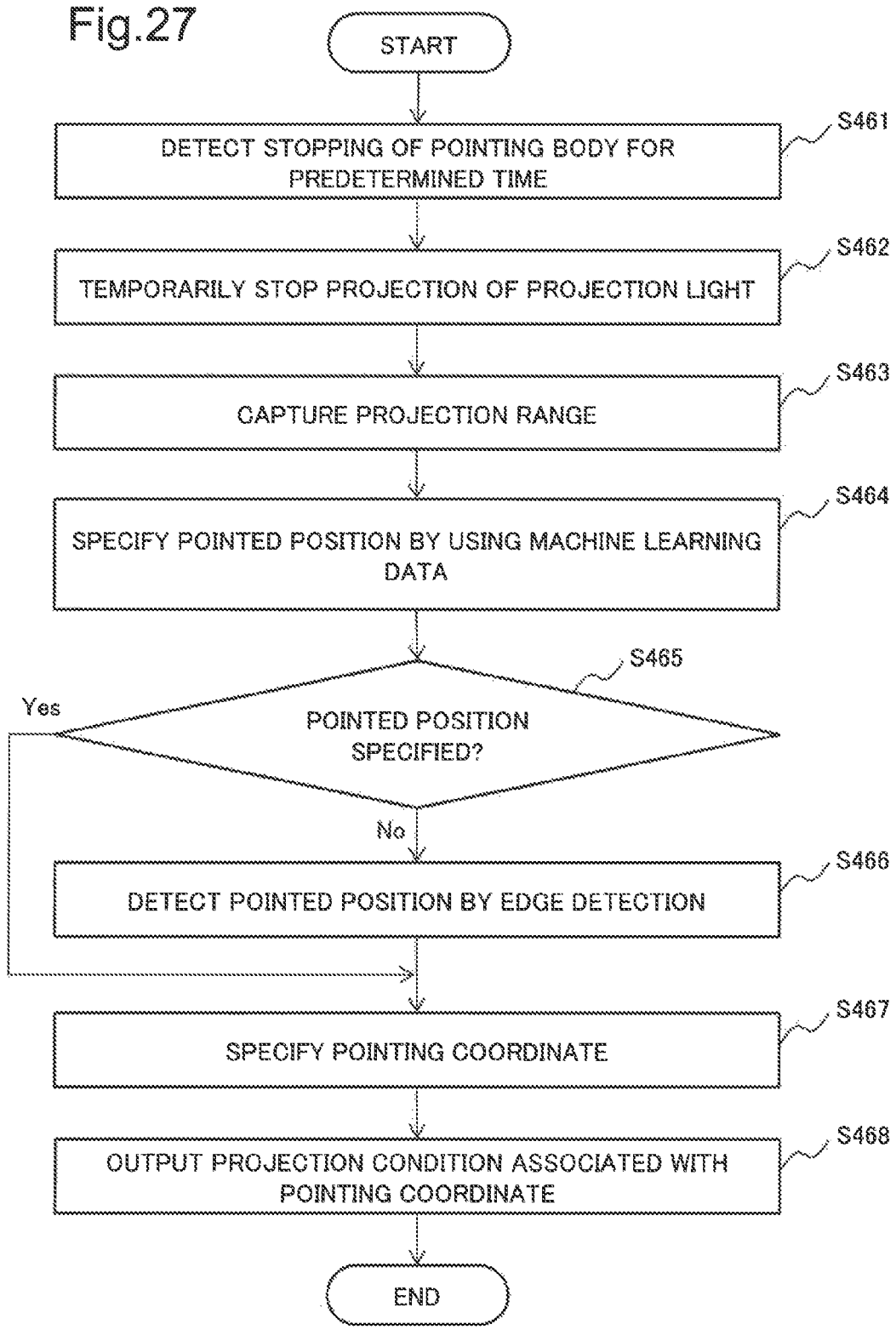
FIG. 27 is a flowchart illustrating another example of the pointed position specifying processing of the information input device according to the third example embodiment of the present invention.

Herein, another operation example relating to the information input device of the present example embodiment is described with reference to the drawings. FIG. 27 is a flowchart illustrating an example of hybrid processing in which processing using machine learning data and edge detection processing are combined.

In FIG. 27, first, the detection means 33 detects a pointing body (Step S461). At this occasion, the detection means 33 outputs, to the projection control means 32, a stop designation signal designating to temporarily stop projection.

The projection control means 32 temporarily stops light projection in response to the stop designation signal (Step S462).

The imaging control means 31 captures a projection range in a state that light projection is stopped (Step S463).

The coordinate setting means 34-3 specifies a pointed position by a pointing portion on image data by using machine learning data stored in the position specifying information storage means 343 (Step S464).

Herein, when the coordinate setting means 34-3 fails to specify a pointed position by a pointing portion (No in Step S465), the coordinate setting means 34-3 detects a pointed position by a pointing portion by using edge detection (Step S466). On the other hand, when the coordinate setting means 34-3 is able to specify a pointed position by a pointing portion (Yes in Step S465), the processing proceeds to Step S467.

The coordinate setting means 34-3 sets a pointing coordinate from the pointed position by the pointing portion (Step S467).

The projection condition setting means 35 outputs, to the projection control means 32, a projection condition for projecting projection light for forming display information associated with the specified pointing coordinate (Step S468).

The foregoing is description relating to projection condition setting processing of the information input device of the present example embodiment.

As described above, in the present example embodiment, a coordinate of a pointing portion is specified by using machine learning data stored in advance. Therefore, in the present example embodiment, it is possible to improve detection accuracy of a pointing portion as compared with the second example embodiment.

Fourth Example Embodiment

Figure 28:
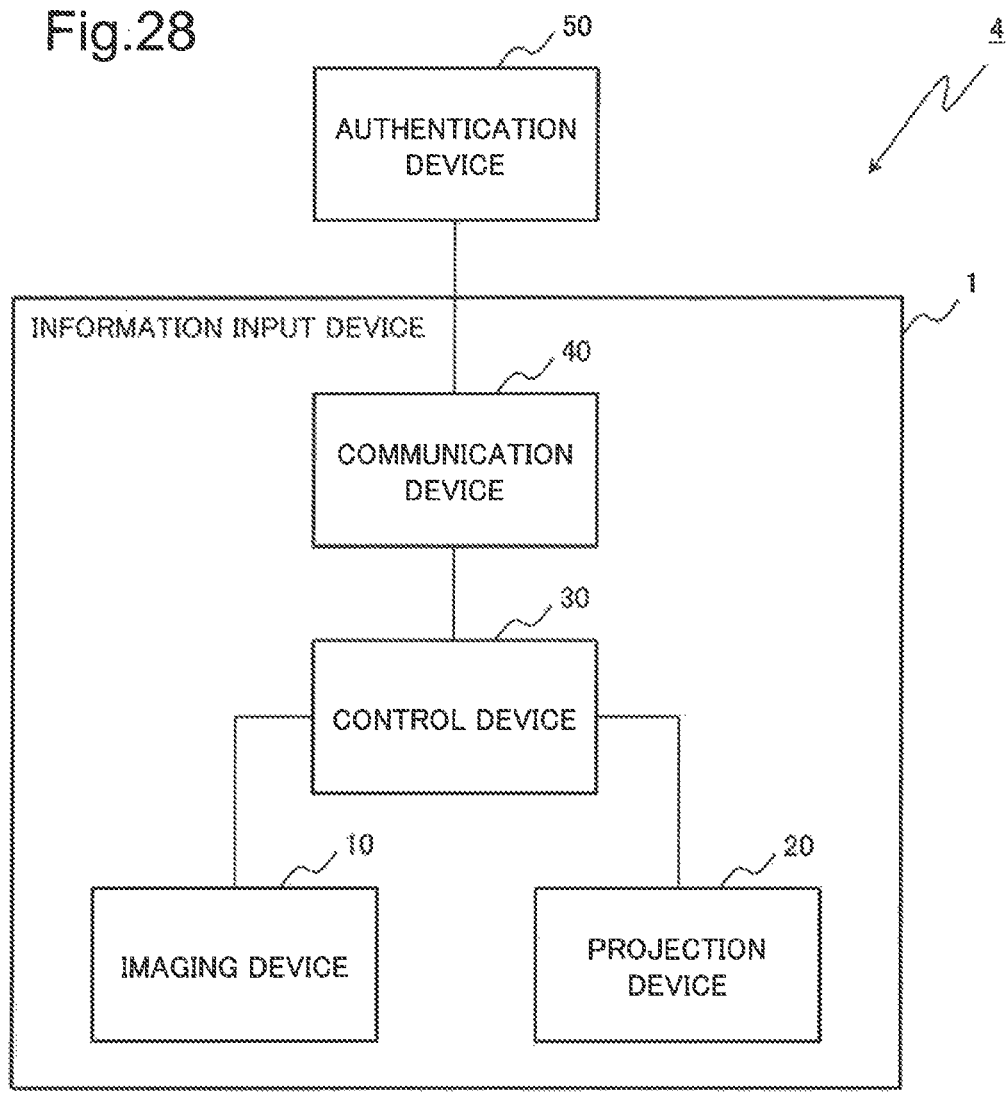
FIG. 28 is a block diagram illustrating a configuration of an authentication system according to a fourth example embodiment of the present invention.

Next, an authentication system according to a fourth example embodiment of the present invention is described with reference to the drawings. FIG. 28 is a block diagram illustrating a configuration of an authentication system 4 of the present example embodiment. As illustrated in FIG. 28, the authentication system 4 has a configuration in which an authentication device 50 is added to the information input device 1. Note that the authentication system 4 may not include the information input device 1 of the first example embodiment, but may include the information input device of the second or third example embodiment.

Figure 29:
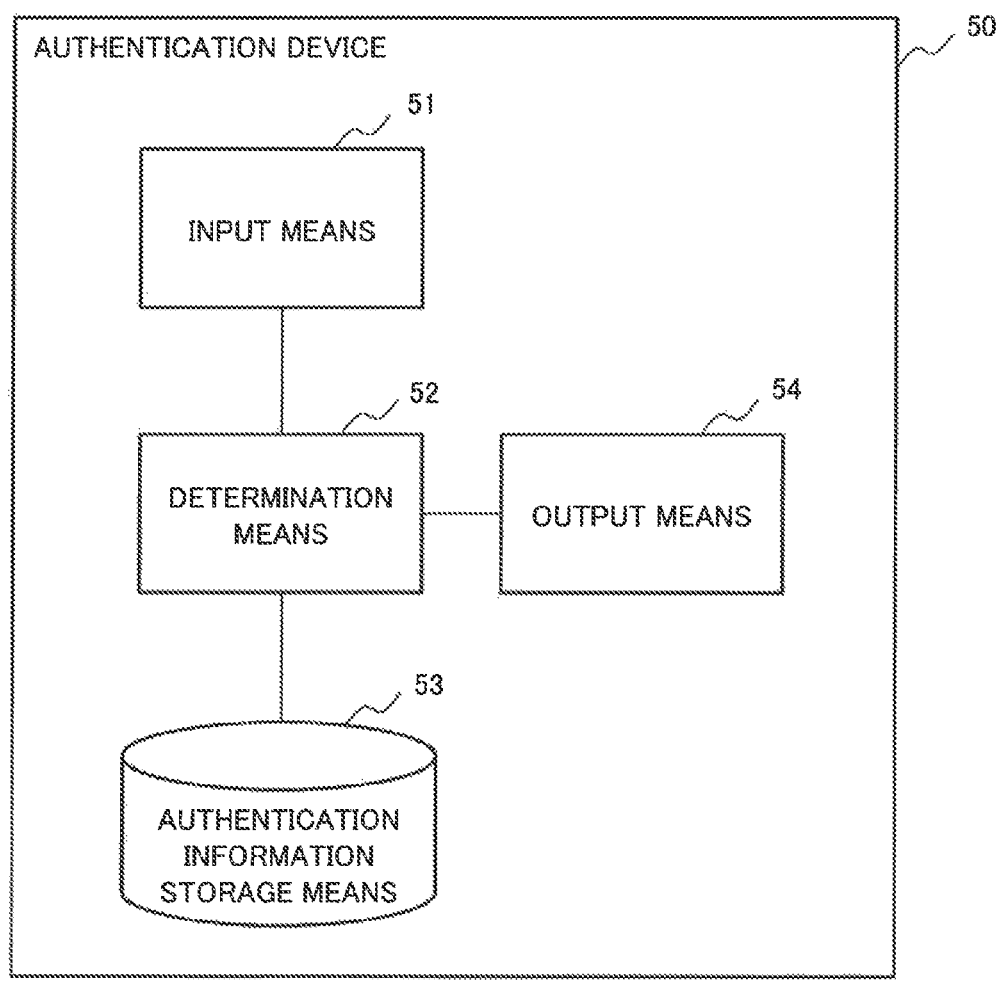
FIG. 29 is a block diagram illustrating a configuration of an authentication device of the authentication system according to the fourth example embodiment of the present invention.

FIG. 29 is a block diagram illustrating a configuration of the authentication device 50 of the authentication system 4. As illustrated in FIG. 29, the authentication device 50 includes an input means 51, a determination means 52, an authentication information storage means 53, and an output means 54.

The input means 51 is connected to a communication device 40 of the information input device 1, and acquires input information toward the information input device 1. The input means 51 outputs the acquired input information to the determination means 52.

The determination means 52 acquires input information from the input means 51. The determination means 52 refers to the authentication information storage means 53 at a point of time when all pieces of input information for use in authentication are acquired, and analyzes the pieces of input information. The determination means 52 determines whether authentication is established, based on an analysis result of authentication information. The determination means 52 outputs a determination result to the output means 54.

The output means 54 outputs a determination result acquired from the determination means 52 to an external system or an external device that is operated in response to an authentication result.

The authentication device 50 may be configured to be connected to the communication device 40 via a network. Further, a function of the authentication device 50 may be imparted to an external system or an external device.

An external system or an external device executes predetermined processing, based on a determination result of the authentication device 50. For example, in a case of an authentication system for an automatic door installed at an entrance or an exit of a building, it is determined whether the door is allowed to be opened or closed, based on an authentication result from the authentication device 50. For example, in a case of an authentication system when a device is used, it is determined whether the device is allowed to be activated, based on an authentication result from the authentication device 50. For example, in a case of an authentication system for an automatic teller machine, it is determined whether cash is withdrawable, based on an authentication result from the authentication device 50. Note that the above-described example is an example describing an application range of an authentication system of the present example embodiment, and does not limit an application range of an authentication system of the present example embodiment.

For example, in the example of FIGS. 23 and 24, the authentication device 50 determines whether authentication is established, based on a positional relationship between a specific position of a picture of an animal displayed on a hand palm as display information, and a pointing portion. Specifically, the authentication device 50 analyzes input information, which is determined based on a positional relationship between a specific position on display information displayed on a projection body, and a pointing portion; and determines whether the analyzed information is established as authentication information.

As described above, an authentication system of the present example embodiment analyzes information constituted by at least one piece of input information to be input to the information input device, and determines whether the analyzed information is established as authentication information. In an authentication system of the present example embodiment, any user is allowed to perform intuitive input processing of authentication information in a scene where the input processing of authentication information is necessary.

Further, in an authentication system of the present example embodiment, pattern authentication may be used. An authentication system of the present example embodiment analyzes pattern information to be input to the information input device, and determines whether the analyzed information is established as authentication information.

Figure 30:
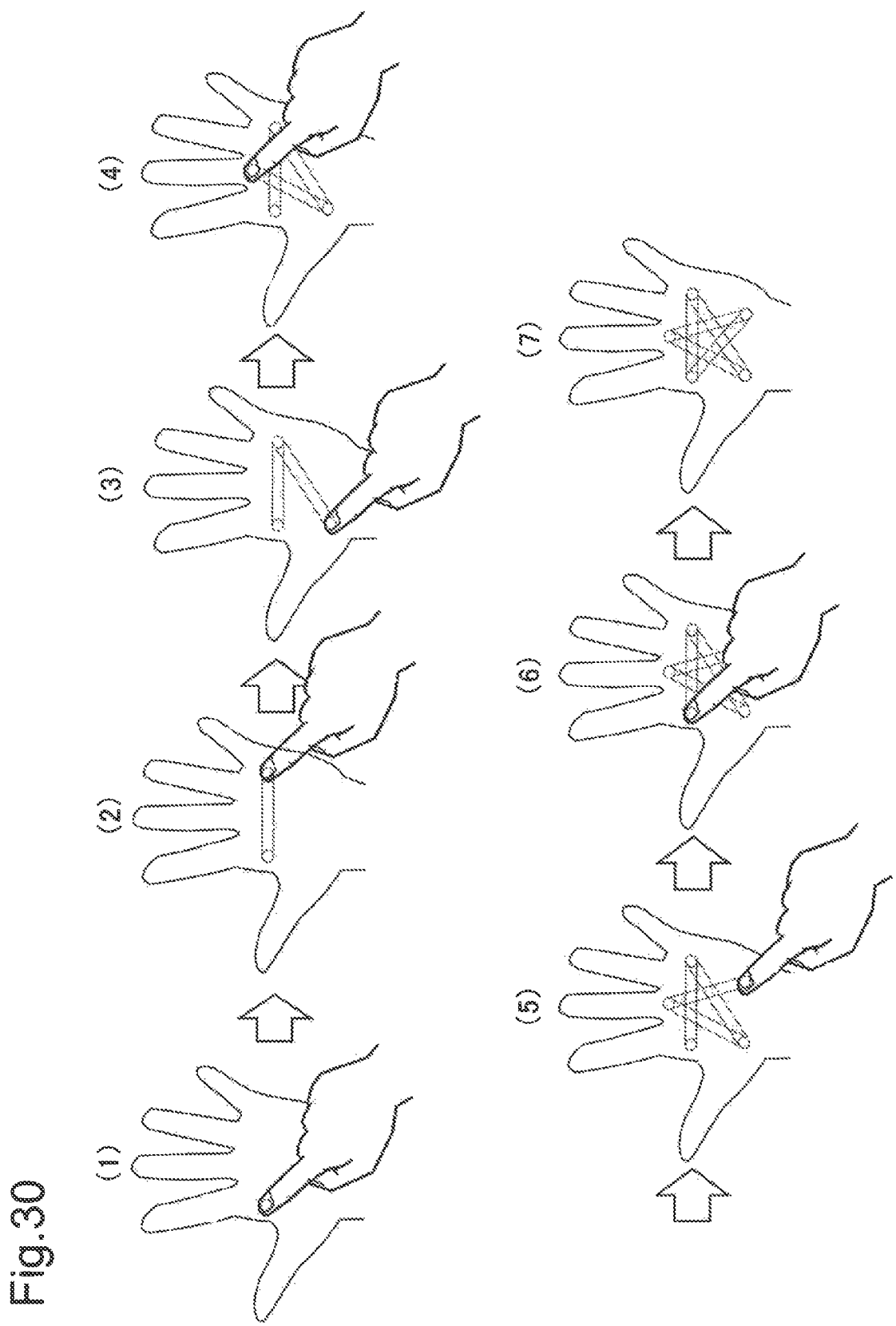
FIG. 30 is a conceptual diagram illustrating an application example of the authentication system according to the fourth example embodiment of the present invention.

FIG. 30 is an application example in which pattern authentication is used in an authentication system of the present example embodiment. The example of FIG. 30 is an example in which a trajectory of a fingertip depicts a pattern of a star shape. In the example of FIG. 30, a fingertip moving in an order from 1 to 6 is detected, and it is determined whether a pattern to be formed by a trajectory of the fingertip is established as authentication information. A pattern based on which authentication information is determined to be established may be stored in the authentication information storage means 53 of the authentication device 50.

In the foregoing application examples, information constituted by at least one piece of input information to be input to the information input device is analyzed, and it is determined whether the analyzed information is established as authentication information. In the present application example, any user is allowed to perform more intuitive input processing of authentication information in a scene where the input processing of authentication information is necessary.

Application Example

Next, an application example of the authentication system 4 of the present example embodiment is described with reference to the drawings. Note that, in drawings on the following application example, only the information input device 1 included in the authentication system 4 is illustrated.

Figure 31:
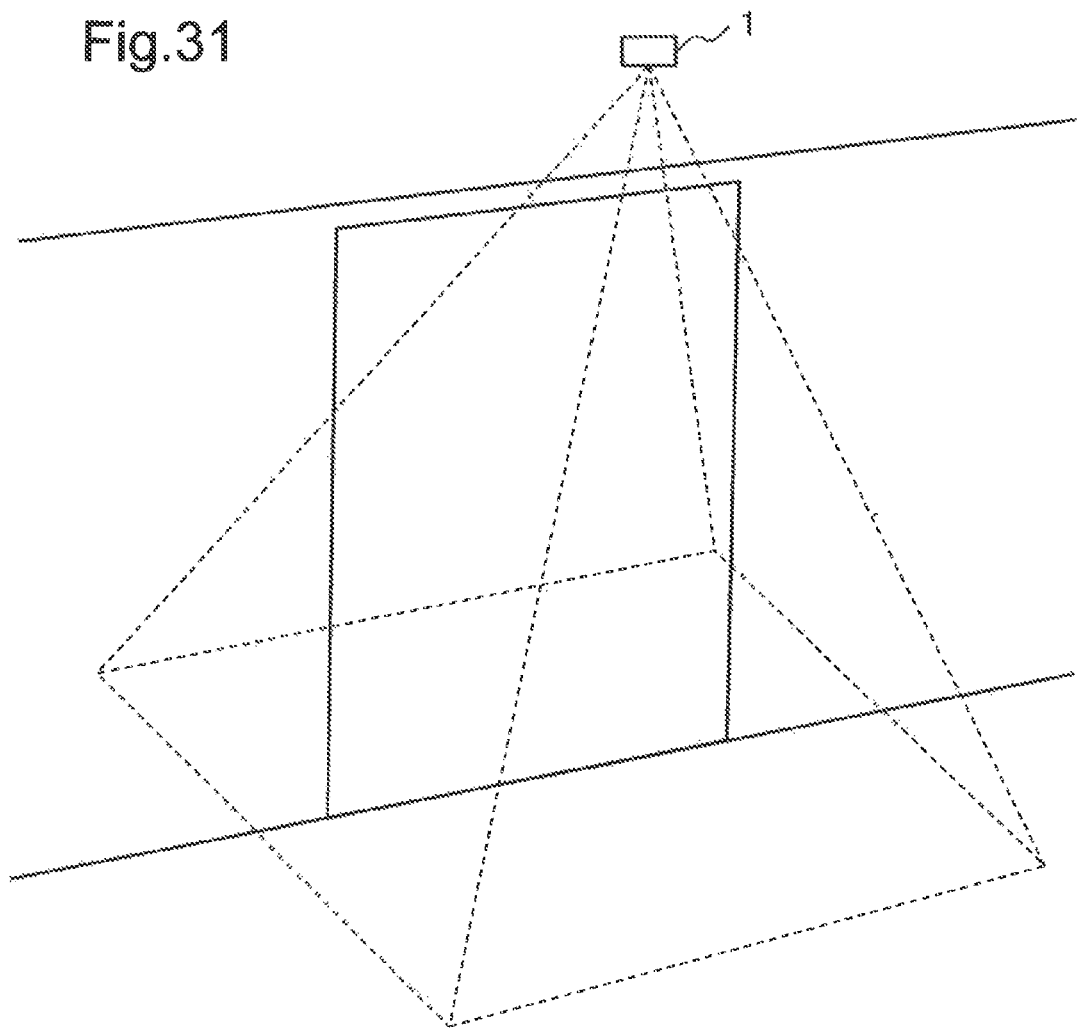
FIG. 31 is a conceptual diagram illustrating an installation example of an information input device according to the fourth example embodiment of the present invention.

FIG. 31 is an example in which the information input device 1 is installed above an automatic door. A projection range of the information input device 1 includes an area in front of the automatic door, and the automatic door itself.

Figure 32:
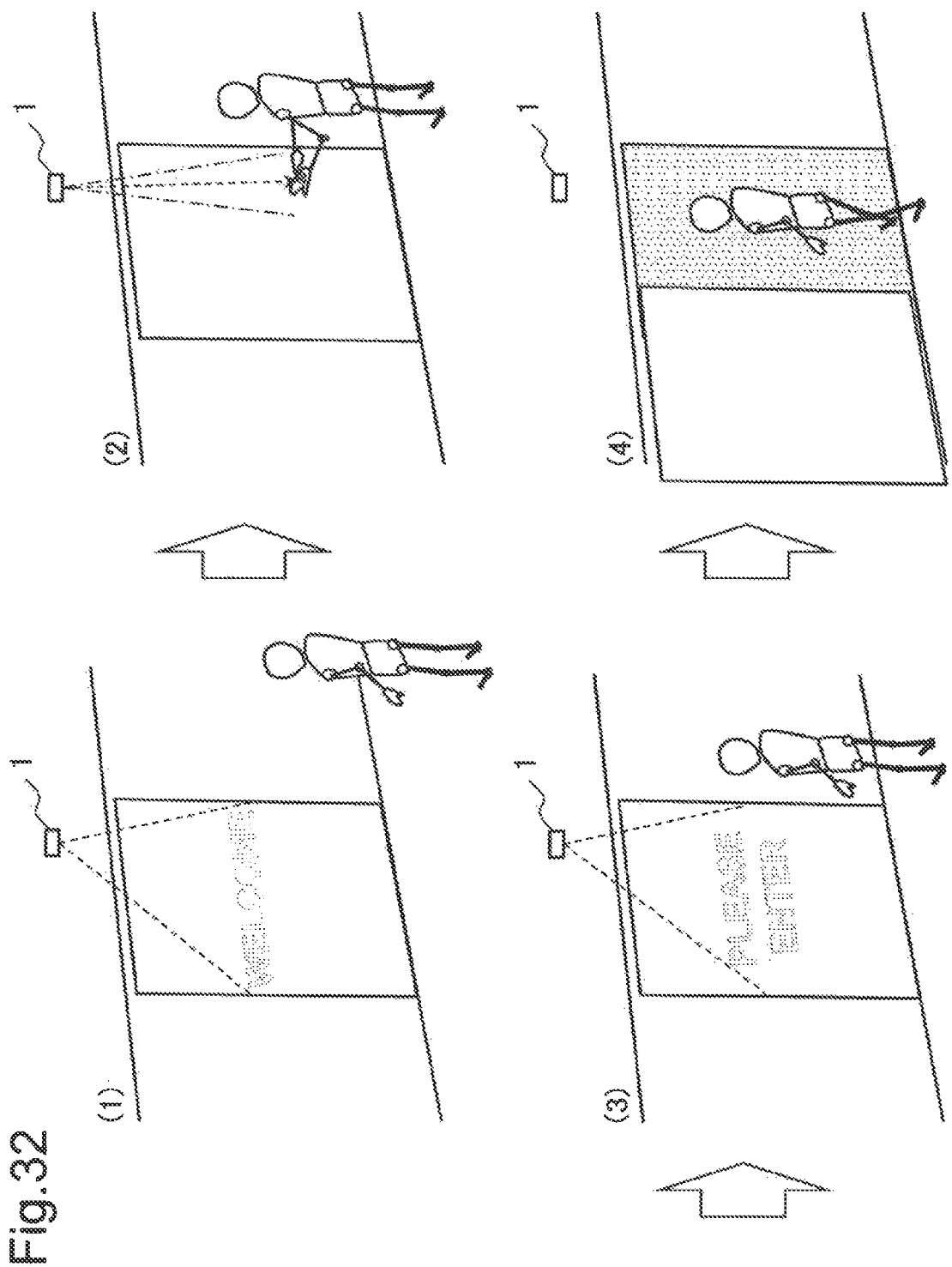
FIG. 32 is a conceptual diagram illustrating an application example of the information input device according to the fourth example embodiment of the present invention.

FIG. 32 is a conceptual diagram illustrating a series of operations, when an authentication target person approaching the automatic door performs authentication processing. Note that, in FIG. 32, projection light from the information input device 1 is indicated by broken lines, and an approximate imaging range is indicated by one-dotted chain lines.

(1) The authentication system 4 projects projection light for displaying display information "WELCOME" toward the automatic door. An authentication target person sees the display information "WELCOME" displayed on the automatic door.

(2) When the authentication target person puts his/her hand palm upward and still in front of the automatic door, the authentication system 4 detects the hand palm of the authentication target person, and projects projection light for displaying, on the hand palm, a UI for allowing the authentication target person to input authentication information. The authentication target person inputs authentication information to the UI displayed on the hand palm.

(3) When authentication is successful, the authentication system 4 projects, onto the automatic door, projection light for displaying display information "PLEASE ENTER", which indicates that the person is authenticated. The authentication target person sees the display information "PLEASE ENTER", which is displayed on the automatic door, and is able to recognize that authentication is successful.

(4) The authentication system 4 outputs, to a control device of the automatic door, a signal designating to open the door in order to open the automatic door. The authentication target person enters a room through the opened automatic door.

As described above, the authentication system 4 of the present example embodiment is able to perform authentication processing with respect to any authentication target person who does not carry an input device. An authentication target person does not have to directly touch a hardware such as a keyboard or a numeric keypad. Therefore, in the present example embodiment, an authentication system of a high security is implemented without leaving a trace of input on a hardware.

[Combination with Face Authentication]

Figure 33:
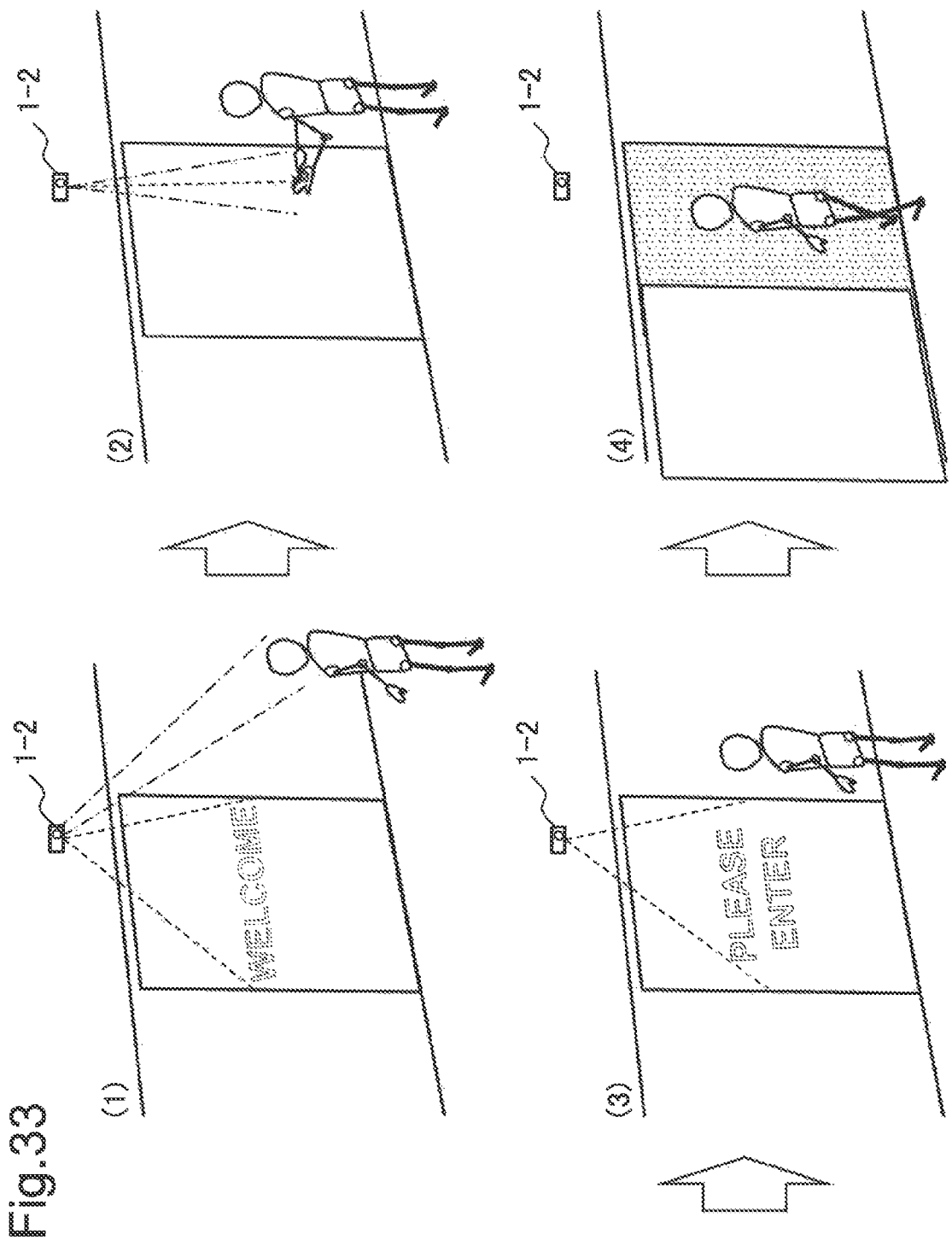
FIG. 33 is a conceptual diagram illustrating an application example of the information input device according to the fourth example embodiment of the present invention.

FIG. 33 is an application example different from the example of FIG. 32. In the application example of FIG. 33, face authentication is used in addition to authentication using a UI displayed on a hand palm. An information input device 1-2 of the application example in FIG. 33 includes a camera for capturing a face of an authentication target person, in addition to an imaging device 10 for capturing a hand palm. Note that, since the application example of FIG. 33 is similar to the example of FIG. 32 except for the state 1, detailed description thereof is omitted.

In the application example of FIG. 33, first, face authentication of an authentication target person is performed (1). Face authentication is performed by configuring a database for face authentication in the authentication device 50, and performing collation between a face captured by the camera and face data stored in the database. Then, when both of hand palm authentication and face authentication are successful, control may be performed to open the automatic door. Note that an order of hand palm authentication and face authentication may be interchanged. Further, it may be configured such that the automatic door is opened, when either one of hand palm authentication or face authentication is successful.

In the application example of FIG. 33, it is possible to implement higher security since an authentication target person is discriminated by face authentication, in addition to authentication using a hand palm.

[Barrier-Free Authentication]

Figure 34:
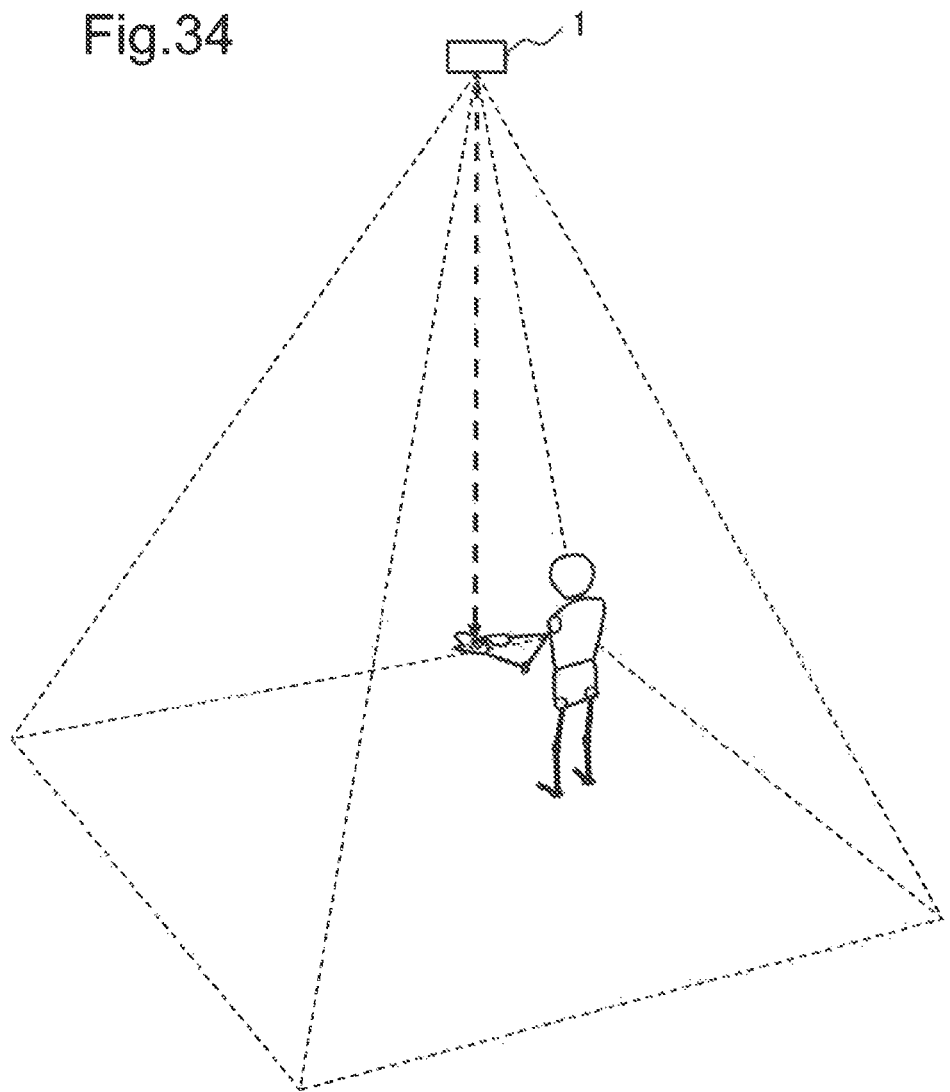
FIG. 34 is a conceptual diagram illustrating an application example of the information input device according to the fourth example embodiment of the present invention.

FIG. 34 is an example in which display information is displayed on a child's hand palm from the information input device 1.

As compared with an adult, a child's hand palm is small. Further, as compared with an adult, a projection distance to a child's hand palm becomes long. Therefore, when a general projector is used, and display information to be displayed on an adult's hand palm is projected onto a child's hand palm, the display information may be deviated from the child's hand palm.

However, using the authentication system 4 of the present example embodiment enables to form display information in accordance with a size of a hand palm, based on image data captured by the imaging device 10. For example, when display information projected first is deviated from a hand palm, the authentication system 4 is only needed to select a projection image of a small size. Therefore, even when display information to be displayed on an adult's hand palm is projected onto a child's hand palm, the display information is displayed within the child's hand palm.

Further, when viewed from a projection device 20, a distance to an adult's hand palm is different from a distance to a child's hand palm. When a general projector is used, and a distance between the projector and a projection body differs, it is necessary to adjust a focal point each time in accordance with a height of an authentication target person.

However, since the projection device 20 included in the authentication system 4 of the present example embodiment includes a phase-modulation-type spatial light modulator element, it is possible to project an image in a focus free state. Therefore, it is not necessary to adjust a focal point in accordance with a height of an authentication target person. Specifically, in the authentication system 4 of the present example embodiment, barrier-free authentication is enabled.

Further, in the present example embodiment, since it is possible to change a position and a height where an input is performed, as necessary, it is also possible to set a feature such as a position where a target person stands, or a way how a target person shows his/her hand, as a part of personal authentication. Further, in the present example embodiment, when finger print authentication or palm print authentication is used, since there is no possibility that a finger print or a palm print is left on an input device or the like, it is possible to configure a safer authentication system. Further, in the present example embodiment, a shape of a hand or a finger, a palm wrinkle, and the like may be used as a part of personal authentication.

(Hardware)

Figure 35:
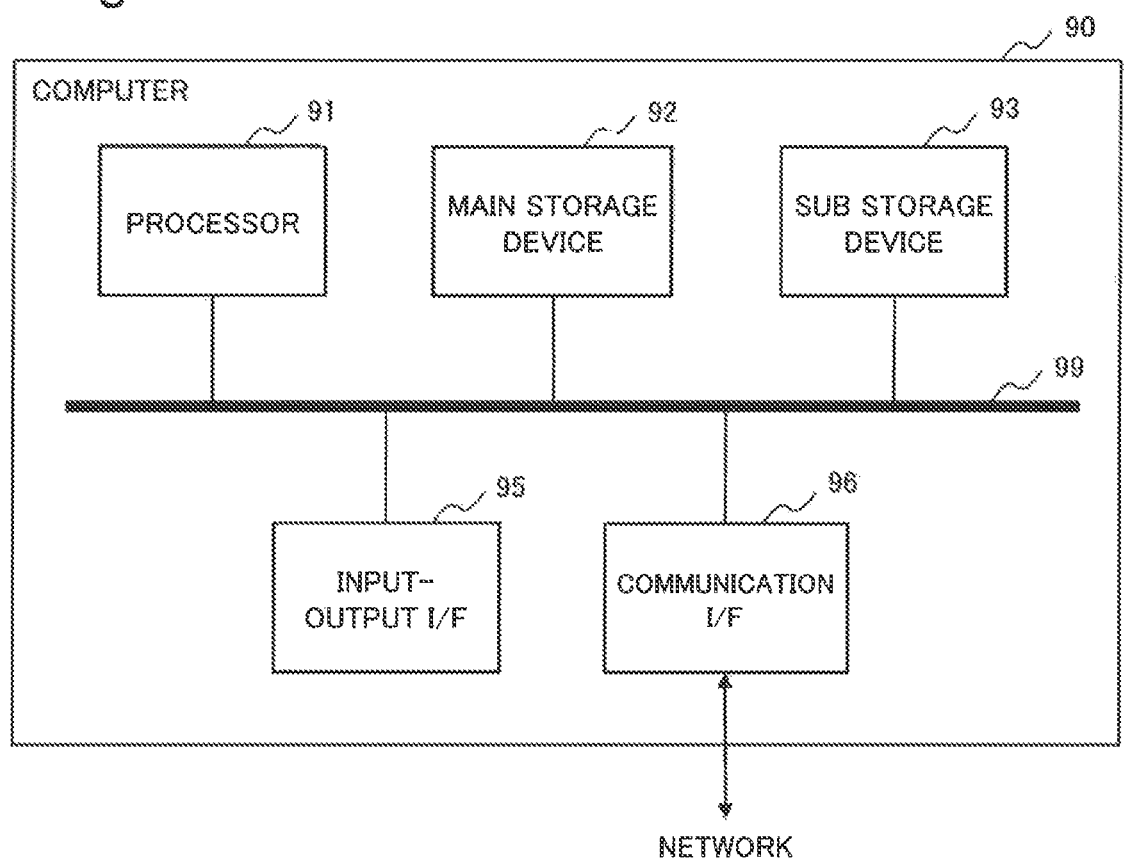
FIG. 35 is a conceptual diagram illustrating an example of a hardware for implementing a control device according to each example embodiment of the present invention.

Herein, a hardware configuration for implementing a control system of the information input device according to the present example embodiment is described by using a computer 90 in FIG. 35 as an example. Note that the computer 90 in FIG. 35 is a configuration example for implementing a projection system of each example embodiment, and does not limit the scope of the present invention.

As illustrated in FIG. 35, the computer 90 includes a processor 91, a main storage device 92, a sub storage device 93, an input-output interface 95, and a communication interface 96. In FIG. 35, an interface is abbreviated as an I/F. The processor 91, the main storage device 92, the sub storage device 93, the input-output interface 95, and the communication interface 96 are connected to one another via a bus 99 for data transmission and reception. Further, the processor 91, the main storage device 92, the sub storage device 93, and the input-output interface 95 are connected to a network such as an intranet or the Internet via the communication interface 96. The computer 90 may be connected to the outside via a network, acquire information such as a phase distribution of display information to be projected from a host system, or output an input result to the outside.

The processor 91 expands a program stored in the sub storage device 93 or the like within the main storage device 92, and executes the expanded program. In the present example embodiment, the processor 91 may be configured to use a software program installed in the computer 90. The processor 91 performs arithmetic processing and control processing to be performed by the control device according to the present example embodiment.

The main storage device 92 has an area where a program is expanded. The main storage device 92 may be a volatile memory such as a dynamic random access memory (DRAM), for example. Further, a non-volatile memory such as a magnetoresistive random access memory (MRAM) may be configured/added as the main storage device 92.

The sub storage device 93 is a means for storing data such as a phase distribution of display information. The sub storage device 93 is constituted by a local disk such as a hard disk or a flash memory. Note that the sub storage device 93 may be omitted by configuring that a phase distribution of display information is stored in the main storage device 92.

The input-output interface 95 is a device for connecting between the computer 90 and peripheral equipment, based on a connection standard between the computer 90 and the peripheral equipment. The communication interface 96 is an interface for connection to a network such as the Internet or an intranet, based on a standard or a specification. The input-output interface 95 and the communication interface 96 may be standardized as an interface to be connected to external equipment.

The computer 90 may be configured to be connectable to input equipment such as a keyboard, a mouse, and a touch panel, as necessary. These pieces of input equipment are used for input of information and settings. Note that, when a touch panel is used as input equipment, a display screen of display equipment may be configured to also serve as an interface of input equipment. Data transmission and reception between the processor 91 and input equipment may be mediated via the input-output interface 95.

The communication interface 96 is connected to an external system or an external device through a network line.

Further, the computer 90 may include display equipment for displaying information. When display equipment is included, the computer 90 may preferably include a display control device (not illustrated) for controlling display of the display equipment. Display equipment may be connected to the computer 90 via the input-output interface 95.

Further, the computer 90 may include a reader/writer, as necessary. A reader/writer is connected to the bus 99. A reader/writer mediates reading of data/program from a recording medium, writing of a processing result of the computer 90 in a recording medium, and the like between the processor 91 and an unillustrated recording medium (program recording medium). A recording medium may be implemented by, for example, a semiconductor recording medium such as a secure digital (SD) card, and a universal serial bus (USB) memory. Further, a recording medium may be implemented by a magnetic recording medium such as a flexible disk, an optical recording medium such as a compact disc (CD) and a digital versatile disc (DVD), or another recording medium.

The foregoing is an example of a hardware configuration for enabling the information input device of an example embodiment of the present invention. Note that a hardware configuration of FIG. 35 is an example of a hardware configuration for enabling the information input device according to the present example embodiment, and does not limit the scope of the present invention. Further, a program for causing a computer to execute processing relating to the information input device according to the present example embodiment is also included in the scope of the present invention. Furthermore, a program recording medium recorded with a program according to an example embodiment of the present invention is also included in the scope of the present invention.

In the foregoing, the present invention is described with reference to example embodiments. The present invention, however, is not limited to the above-described example embodiments. A configuration and details of the present invention may be modified in various ways comprehensible to a person skilled in the art within the scope of the present invention.

This application is based upon and claims the benefit of priority from Japanese Patent Application No. 2016-210192, filed on Oct. 27, 2016, the disclosure of which is incorporated herein in its entirety by reference.

INDUSTRIAL APPLICABILITY

An information input device according to the present invention is applicable to input of any information other than authentication information. An information input device according to the present invention is applicable to business support of retail shops, restaurants, logistics, factories, medical fields, defense activities, fire fighting activities, police activities, and the like, for example.

REFERENCE SIGNS LIST

1 Information input device
4 Authentication system
10 Imaging device
11 Imaging element
13 Image processing processor
15 Internal memory
17 Data output circuit
20 Projection device
21 Light source
22 Light source driving power supply
23 Spatial light modulator element
24 Modulator element driving means
25 Projection optical system
30 Control device
31 Imaging control means
32 Projection control means
33 Detection means
34 Coordinate setting means
35 Projection condition setting means
36 Projection condition storage means
37 Pointed content identifying means
38 Pointed content storage means
39 Output means
40 Communication device
50 Authentication device
51 Input means
52 Determination means
53 Authentication information storage means
54 Output means
210 Collimator
251 Fourier transform lens
252 Aperture
253 Projection lens
331 Projection body detection means
332 Enter detection means
333 Pointing body detection means
341 Projection coordinate system setting means
342 Pointing coordinate specifying means
343 Position specifying information storage means

The invention claimed is:
1. An information input device comprising:
a projector configured to project projection light in a projection area;
a camera configured to generate image data by capturing the projection range; and
at least one memory configured to store computer program code; and
at least one processor configured to execute the computer program code to:
detect a target entering the projection range, based on a feature of the target including a projection body and a projection prohibited body being included in the image data generated by controlling the camera;
control the projector to project, onto the projection body, projection light that causes to display, on the projection body, display information for accepting an input;
detect that a pointing body enters an upper area of the projection body, based on the image data;
determine information input according to the movement of the pointing body in an upper area of the projection body;
identify a pointed content, based on a positional relationship between the display information displayed on the projection body, and a pointing portion included in the pointing body; transmit the identified pointed content to an outside as input information;
control the projector in such a way as not to project projection light onto the projection prohibited body;
control the camera in such a way as to capture the projection range;
detect the projection body and the pointing body located in the projection range, from the image data;
generate a designation signal associated with a detection state of the projection body and the pointing body;
set a projection coordinate system on the detected projection body in response to the designation signal;
specify in the projection coordinate system, a pointing coordinate indicating a position of a pointing portion included in the pointing body detected in an upper area of the projection body;
set a projection condition of projection light for forming, on the projection body, the display information based on the projection coordinate system and the pointing coordinate;
control the projector, based on the projection condition;
identify a pointed content, based on the pointing coordinate;
output the identified pointed content in response to the designation signal;
analyze the image data;
determine that, when detecting that an area of a region acquired by joining the projection body and the pointing body increases, the pointing body enters an upper area of the projection body;
determine that information input by the pointing body is performed, at a point of time when stopping of the pointing body in an upper area of the projection body for a certain time is detected;
output the pointed content at a point of time when stopping of the pointing body in an upper area of the projection body for the certain time is detected; and
control the projector in such a way as to switch the display information to be projected onto the projection body at a point of time when deviation of the pointing body from an upper area of the projection body is detected.

2. The information input device according to claim 1, wherein
the at least one processor is further configured to execute the computer program code to:
analyze the image data; determine that information input by the pointing portion is performed, at a point of time when the pointing body is deviated from an upper area of the projection body; and,
output the pointed content at a point of time when deviation of the pointing body from an upper area of the projection body is detected.

3. The information input device according to claim 1, wherein
the at least one processor is further configured to execute the computer program code to:
detect the projection body in the image data;
generate a first designation signal designating to set the projection coordinate system on the detected projection body;
detect a state that the pointing body is located in an upper area of the projection body;
extract the pointing body, when stopping of the pointing body for the certain time is detected;
generate a second designation signal designating to set the pointing coordinate on the pointing portion included in the extracted pointing body;
set the projection coordinate system according to the projection body, in response to the first designation signal;
specify the pointing coordinate of the pointing portion in the projection coordinate system by analyzing the image data, in response to the second designation signal; and,
when detecting a state that the pointing body is deviated from an upper area of the projection body, output input information selected by the projection body.

4. The information input device according to claim 3, wherein
the at least one processor is further configured to execute the computer program code to:
store machine learning data indicating that a pointed position by the pointing portion on a plurality of pieces of the image data in a state that the pointing body is located on the projection body is learned;
specify the pointing coordinate of the pointing portion in the image data generated by the camera by using the machine learning data; and
identify, from among position coordinates at each of which the pointed content is set, that the pointed content set on the position coordinate most proximate to the specified pointing coordinate is selected.

5. The information input device according to claim 1, wherein
the projector includes
a light source,
a light source driver configured to drive the light source in response to control by the at least one processor,
a phase-modulation-type spatial light modulator element including a display part for reflecting emission light from the light source,
a modulator element driver configured to cause a pattern for generating the display information to be displayed on the projection body, to be displayed on the display part of the spatial light modulator element, in response to control by the at least one processor, and
a projection optical system for projecting modulated light modulated by the spatial light modulator element as projection light.

6. An authentication system comprising:
the information input device according to claim 1; and
an authentication device configured to determine, by analyzing information constituted of at least one piece of input information to be input to the information input device, whether analyzed information is established as authentication information.

7. The authentication system according to claim 6, wherein the authentication device determines whether analyzed information is established as authentication information by analyzing at least one piece of input information that is determined based on a positional relationship between a specific position on the display information displayed on the projection body, and the pointing portion.

8. An information input method using an information input device including a projector for projecting projection light in a projection range, a camera for generating image data by capturing the projection range, and a controller for controlling the projector and the camera, the method comprising, by the controller:
detecting a target entering the projection range, based on a feature of the target including a projection body and a projection prohibited body being included in the image data generated by controlling the camera;
controlling the projector to project, onto the projection body, projection light that causes to display, on the projection body, display information for accepting an input;
detecting that a pointing body enters an upper area of the projection body, based on the image data;
determining information input according to the movement of the pointing body in an upper area of the projection body;
identifying a pointed content, based on a positional relationship between the display information displayed on the projection body, and a pointing portion included in the pointing body;
transmitting the identified pointed content to an outside as input information;
controlling the projector in such a way as not to project projection light onto the projection prohibited body;
controlling the camera in such a way as to capture the projection range;
detecting the projection body and the pointing body located in the projection range, from the image data;
generating a designation signal associated with a detection state of the projection body and the pointing body;
setting a projection coordinate system on the detected projection body in response to the designation signal;
specifying in the projection coordinate system, a pointing coordinate indicating a position of a pointing portion included in the pointing body detected in an upper area of the projection body;
setting a projection condition of projection light for forming, on the projection body, the display information based on the projection coordinate system and the pointing coordinate;
controlling the projector, based on the projection condition;
identifying a pointed content, based on the pointing coordinate;
outputting the identified pointed content in response to the designation signal;
analyzing the image data;

determining that, when detecting that an area of a region acquired by joining the projection body and the pointing body increases, the pointing body enters an upper area of the projection body;

determining that information input by the pointing body is performed, at a point of time when stopping of the pointing body in an upper area of the projection body for a certain time is detected;

outputting the pointed content at a point of time when stopping of the pointing body in an upper area of the projection body for the certain time is detected; and controlling the projector in such a way as to switch the display information to be projected onto the projection body at a point of time when deviation of the pointing body from an upper area of the projection body is detected.

* * * * *